(12) United States Patent
Teja

(10) Patent No.: US 12,519,635 B2
(45) Date of Patent: *Jan. 6, 2026

(54) METHODS AND SYSTEMS FOR GENERATING, SUBSCRIBING TO AND PROCESSING ACTION PLANS USING A BLOCKCHAIN

(71) Applicant: Zubin Teja, Coral Springs, FL (US)

(72) Inventor: Zubin Teja, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/989,782

(22) Filed: Nov. 18, 2022

(65) Prior Publication Data

US 2023/0327872 A1    Oct. 12, 2023

Related U.S. Application Data

(63) Continuation of application No. 17/718,876, filed on Apr. 12, 2022, now Pat. No. 11,563,571.

(51) Int. Cl.
*H04L 29/06* (2006.01)
*H04L 9/06* (2006.01)
(Continued)

(52) U.S. Cl.
CPC .......... *H04L 9/0894* (2013.01); *H04L 9/0656* (2013.01); *H04L 9/3247* (2013.01)

(58) Field of Classification Search
CPC ... H04L 9/0894; H04L 9/0656; H04L 9/3247; H04L 63/0428; H04L 2209/56;
(Continued)

(56) References Cited

U.S. PATENT DOCUMENTS

| 7,991,624 B2 | 8/2011 | Malone |
| 10,915,891 B1 | 2/2021 | Winklevoss et al. |

(Continued)

FOREIGN PATENT DOCUMENTS

| CN | 107679976 B | 2/2021 |
| CN | 111639924 B | 5/2021 |
| WO | 2019146934 A1 | 8/2019 |

OTHER PUBLICATIONS

Notification of Transmittal of the International Search Report and The Written Opinion of the International Searching Authority, or the Declaration, dated Jul. 10, 2023, issued in corresponding International Application No. PCT/US2023/016384, 13 pgs.

(Continued)

*Primary Examiner* — Joseph P Hirl
*Assistant Examiner* — Leynna Truvan
(74) *Attorney, Agent, or Firm* — Panitch Schwarze Belisario & Nadel LLP

(57) ABSTRACT

A method and system and computer program product for subscribing to action plans including a processing device for receiving an encrypted action plan summary transaction message including one or more fields from an analyst node in a blockchain network and generating an encrypted action plan summary transaction in a blockchain including the content of the encrypted action plan summary transaction message. The processing device may transmit the encrypted action plan summary transaction to the blockchain network. The processing device may transmit an encrypted action plan summary notice to the blockchain network alerting the nodes of the blockchain network to the encrypted action plan summary transaction.

23 Claims, 16 Drawing Sheets

(51) Int. Cl.
  *H04L 9/08* (2006.01)
  *H04L 9/32* (2006.01)

(58) Field of Classification Search
  CPC ..... H04L 63/126; H04L 9/50; H04L 12/5885; H04L 29/06863; H04L 63/0227; H04L 63/123; G06Q 20/02; G06Q 20/065; G06Q 20/223; G06Q 20/3678; G06Q 20/3827; G06Q 20/3829; G06Q 20/389; G06Q 20/401; G06Q 20/4016; G06Q 20/382; G06Q 20/3823; G06Q 20/409; G06Q 20/4097; G06Q 20/425; G06F 16/24542; G06F 17/30433; G06F 2212/402; G06F 9/466; G06F 16/2308; G06F 17/30008; G06F 17/30348; H04W 28/0804; H04W 72/0486; H04W 12/106; H04W 12/1006; H04W 88/023; H04N 1/00071; H04N 1/00867; H04N 21/26606; H04N 21/4623; H04M 3/53375; H04M 15/8221; H04M 2203/4581; H04M 2215/7826; H04M 15/8242; H04M 2215/7846; G05B 2219/25111; G05B 2219/31175; G05B 2219/25208; G08B 21/0022; G08B 25/007; G11B 20/00492; G07D 11/32
  See application file for complete search history.

(56) References Cited

U.S. PATENT DOCUMENTS

| | | | |
|---|---|---|---|
| 11,074,663 | B2 | 7/2021 | Rollins et al. |
| 11,164,254 | B1* | 11/2021 | Gordon, III ........... G06Q 20/02 |
| 11,563,571 | B1 | 1/2023 | Teja |
| 2018/0211202 | A1 | 7/2018 | Ynion, Jr. |
| 2019/0205873 | A1 | 7/2019 | Kamalsky et al. |
| 2020/0084027 | A1* | 3/2020 | Duchon ................ G06F 21/602 |
| 2021/0264520 | A1 | 8/2021 | Cummings |
| 2021/0334836 | A1 | 10/2021 | Singh et al. |
| 2021/0342836 | A1 | 11/2021 | Cella et al. |
| 2021/0365867 | A1 | 11/2021 | Kim |
| 2022/0036373 | A1 | 2/2022 | O'Brien |
| 2022/0050929 | A1 | 2/2022 | Kades |
| 2022/0068504 | A1 | 3/2022 | Yuz et al. |
| 2022/0076253 | A1* | 3/2022 | Chaum ................ G06Q 20/322 |
| 2022/0092686 | A1 | 3/2022 | Sekar et al. |
| 2022/0158841 | A1 | 5/2022 | Bertin et al. |
| 2022/0171385 | A1 | 6/2022 | Cui et al. |
| 2022/0180319 | A1 | 6/2022 | Saxena et al. |
| 2022/0188672 | A1 | 6/2022 | Basch et al. |
| 2022/0197913 | A1 | 6/2022 | Lewis et al. |
| 2022/0198366 | A1 | 6/2022 | Narayanaswamy et al. |
| 2022/0215059 | A1 | 7/2022 | Evans |

OTHER PUBLICATIONS

Extended European Search Report, dated Oct. 2, 2025, in corresponding European Application No. 23788742.7.

* cited by examiner

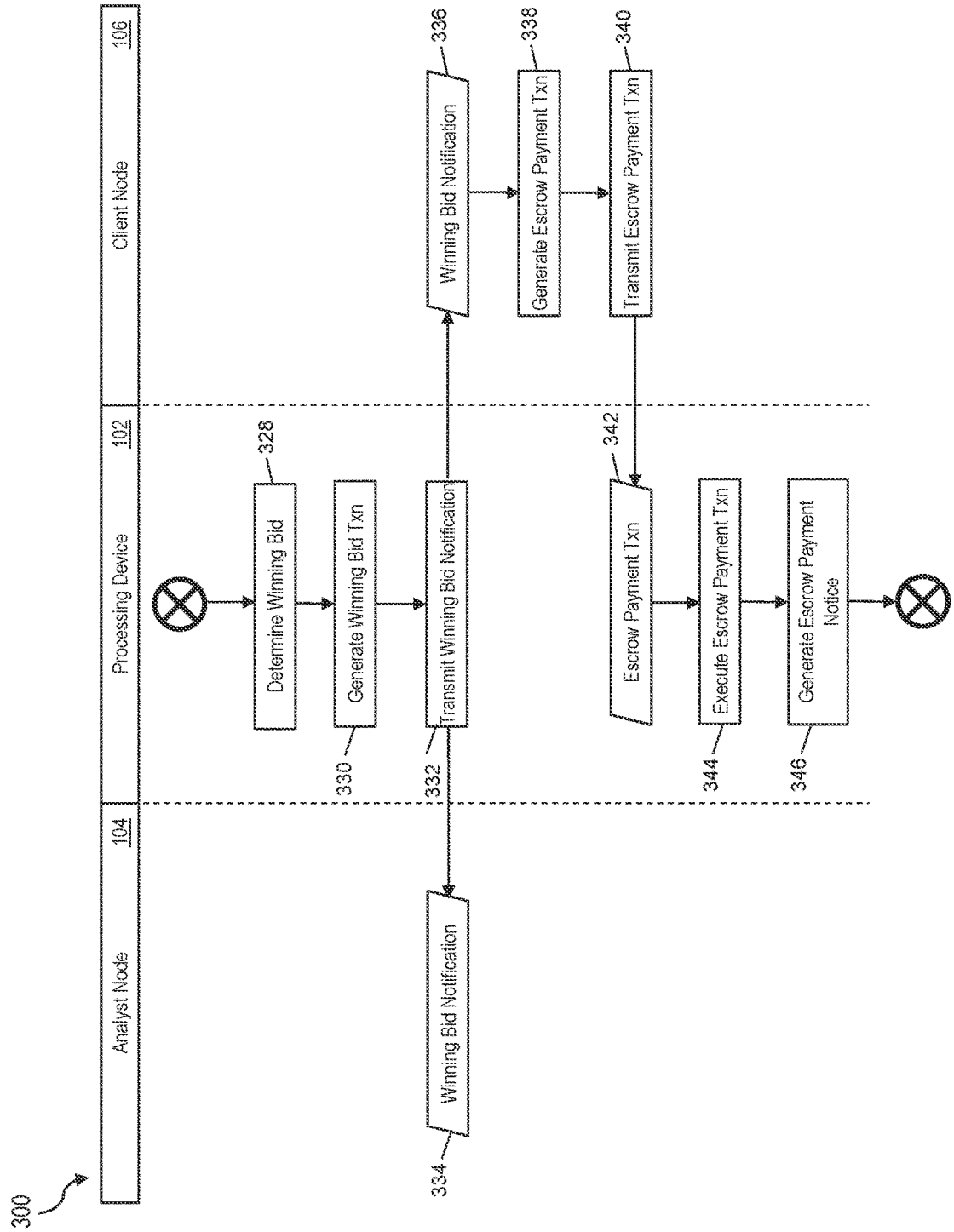

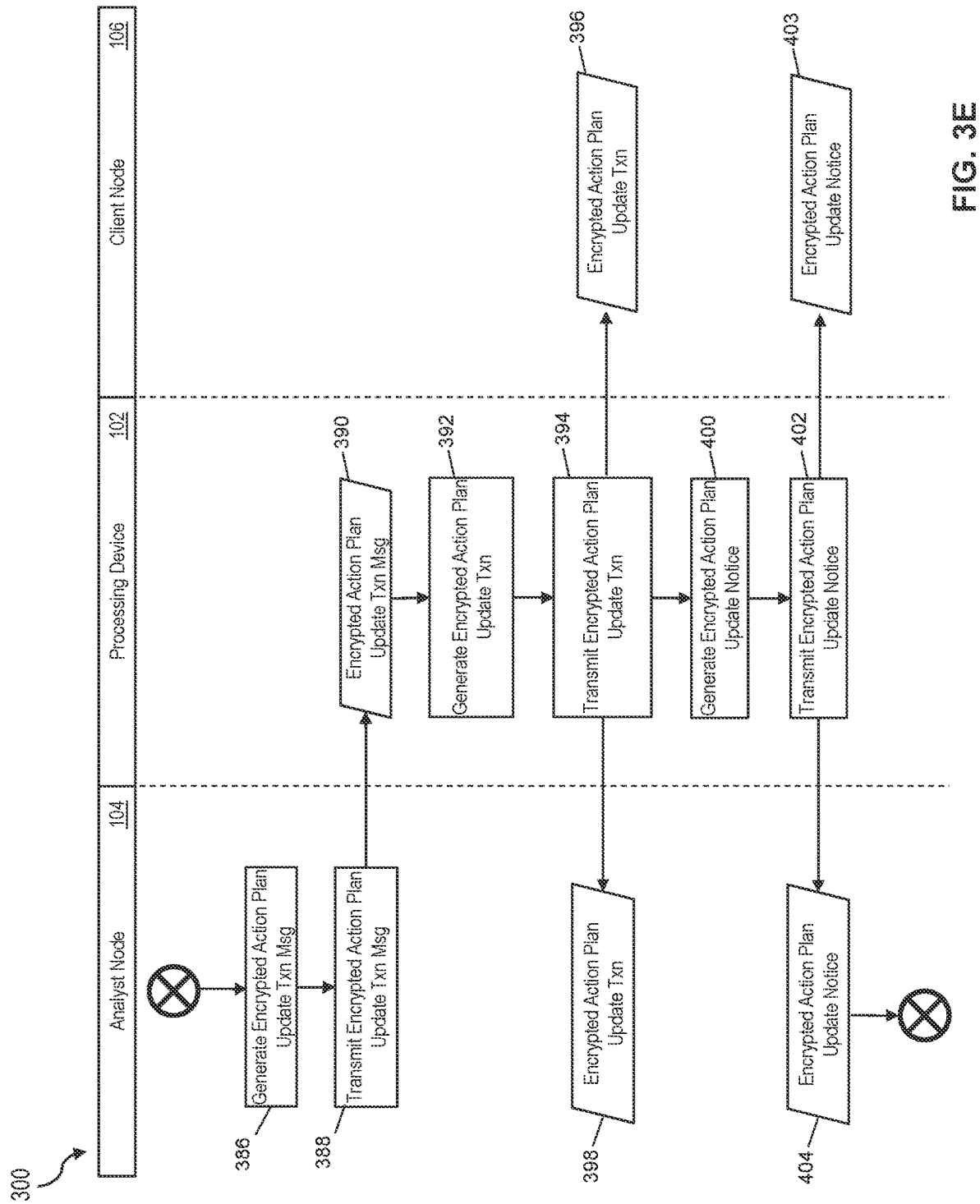

RFP Message 450

Client ID: Client A
Time: 2/1/2021 13:30 EST
RFP ID: 20001
Category ID: 001 (e.g., Semiconductor Equity Securities)
Description of Plan Preferences: Semiconductor Equity Securities
– North America
Client A Digital Signature

FIG. 4A

Action Plan Transaction Message 452

Analyst ID: Analyst B
Plan Conviction: 7
Category ID: 001 (e.g., Semiconductor Equity Securities)
Category Track Record: 10%
RFP ID: 20001
No Illegal Information Attestation
Analyst B Digital Signature

FIG. 4B

Action Plan Notice 454

Plan ID: 004
Analyst ID: Analyst B
Plan Conviction: 7
Category ID: 001 (e.g., Semiconductor Equity Securities)
Category Track Record: 10%
RFP ID: 20001
No Illegal Information Attestation
Analyst B Digital Signature

FIG. 4C

Client Bid 456

Plan ID: 004
Client ID: Client A
Bid Amount: USD 100
Client A Public Key
Client A Digital Signature

FIG. 4D

Escrow Payment Notice 458

Plan ID: 004
Analyst ID: Analyst B
Client ID: Client A
Bid Amount: USD 100
Client A Public Key

FIG. 4E

Encrypted Action Plan Summary Transaction Message 460

Analyst ID: Analyst B
Plan ID: 004
Analyst Digital Signature
Client ID: Client A
Plan Information (Encrypted with Client A Public Key):
　　Subject ID: 1002 (e.g., NVIDIA Corp. Common Stock)
　　Plan Conviction: 7
　　Tilt: Increase
　　Plan Overview
　　Random Number: 342547

FIG. 4F

Encrypted Action Plan Update Transaction Message 462

Analyst ID: Analyst B
Client ID: Client A
Update Time: 2/8/2021 14:00 EST
Plan ID: 004
Analyst Digital Signature
Plan Update Information (Encrypted with Client A Public Key):
　　Plan Status: Open
　　Random Number: 745243

FIG. 4G

502 – Action Plan Data Table

| Plan ID | Analyst ID | Category ID | Client ID #1 | Client ID #2 | Client ID #3 | Bid #1 | Bid #2 | Bid #3 | Escrow | Paid | Subject ID | Tilt | Plan Correction | Start Time | Start Value | End Time | End Value | Plan Return |
|---|---|---|---|---|---|---|---|---|---|---|---|---|---|---|---|---|---|---|
| 004 | Analyst B | 001 | Client A | Client B | Client C | 100 | 90 | 80 | 270 | 270 | 1002 | Increase | 7 | 2/1/21 14:00 EST | 130 | 2/1/22 14:00 EST | 143 | 10 |

504 – Category Table

| Category ID | Category Name | Start Value Function | End Value Function | Plan Return Function |
|---|---|---|---|---|
| 001 | Semiconductor Equity Securities | Subject's volume-weighted average price (VWAP) between 14:00 and 16:00 EST on the start time day | Subject price at the end time | Annualized return, based on the start and end times, from the difference between (1) the percentage change between the start value and the end value and (2) the percentage change in the PHLX Semiconductor Sector index between the start and end times |

506 – Subject Table

| Subject ID | Subject Name | Category ID |
|---|---|---|
| 1002 | NVIDIA Corp Common Stock | 001 |

FIG. 5

METHODS AND SYSTEMS FOR GENERATING, SUBSCRIBING TO AND PROCESSING ACTION PLANS USING A BLOCKCHAIN

FIELD

The present disclosure relates to methods and systems for generating, subscribing to and processing action plans using a blockchain. More particularly, the present disclosure relates to the processing of proposed action plan transactions via a blockchain network.

BACKGROUND

Blockchain was initially developed as a storage mechanism for use in conducting cryptographic token transactions. Decentralization, distributed computing, transaction transparency and user anonymity are beneficial attributes of blockchains. Blockchains offer enhanced security due to their immutable nature and the cryptography used in their operation. In recent years, blockchains have evolved beyond cryptographic token transaction use cases and are utilized in many fields where the storage and/or transfer of data is required.

Investors often rely upon expert analysts for recommendations regarding financial asset transactions. However, analysts are faced with a trade-off between providing these action plans (e.g., to purchase or sell an asset) on an exclusive basis, which maximizes their value to the client, or disseminating them broadly, which enables the generation of a verified public track record for the analyst. For example, an analyst can sell proprietary research supporting the purchase of an equity security to a single investor client who can then transact in the security prior to any wide disclosure of the analyst's assessment. However, because this private distribution cannot be independently verified, the analyst cannot develop a reputation, particularly if the security price appreciates prior to the analyst sharing the research publicly. Alternatively, the analyst can broadcast a recommended action plan into the public record (e.g., via an online forum or distribution list) prior to any private disclosure, however, the conclusions will then be freely available and reflected in the security price, limiting subsequent monetization. A third option would be for the action plan to be sent concurrently to a paying investor client and a third-party who records the action plan in a private database, however, the third-party could divulge or inaccurately record it. Thus, there is a need for a decentralized, immutable system which facilitates private transmission of action plans whose contents can later be verified by parties unable to view the contents of the original private transmission.

SUMMARY

A method for configuring a computer for subscribing to action plans is disclosed. The method includes: receiving, by a processing device, from an analyst node in a blockchain network, an encrypted action plan summary transaction message including one or more data fields and an encryption of a hash of the one or more data fields using an analyst private key of an analyst cryptographic key pair associated with the analyst node, the one or more data fields including an analyst identification, a client identification of a client node associated with a winning client bid, a plan identification associated with the winning client bid, a category identification and plan information, the plan information encrypted using a client public key of a client cryptographic key pair corresponding to the client node associated with the winning client bid, the plan information including a subject identification, a tilt value and a random number; generating, by the processing device, an encrypted action plan summary transaction including the content of the encrypted action plan summary transaction message; transmitting, by the processing device, the encrypted action plan summary transaction to the blockchain network, the blockchain network having a plurality of nodes including a client node associated with the client identification and the analyst node; and transmitting, by the processing device, an encrypted action plan summary notice to the blockchain network, the encrypted action plan summary notice alerting the nodes of the blockchain network to the encrypted action plan summary transaction.

A system for subscribing to action plans is disclosed. The system including one or more processors, one or more computer-readable memories, one or more computer-readable tangible storage devices, and instructions stored on at least one of the one or more storage devices for execution by at least one of the one or more processors via at least one of the one or more memories. The instructions include: instructions to receive from an analyst node in a blockchain network, an encrypted action plan summary transaction message including one or more data fields and an encryption of a hash of the one or more data fields using an analyst private key of an analyst cryptographic key pair associated with the analyst node, the one or more data fields including an analyst identification, a client identification of a client node associated with a winning client bid, a plan identification associated with the winning client bid, a category identification and plan information, the plan information encrypted using a client public key of a client cryptographic key pair corresponding to the client node associated with the winning client bid, the plan information including a subject identification, a tilt value and a random number; instructions to generate an encrypted action plan summary transaction including the content of the encrypted action plan summary transaction message; instructions to transmit the encrypted action plan summary transaction to the blockchain network, the blockchain network having a plurality of nodes including a client node associated with the client identification and the analyst node; and instructions to transmit an encrypted action plan summary notice to the blockchain network, the encrypted action plan summary notice alerting the nodes of the blockchain network to the encrypted action plan summary transaction.

BRIEF DESCRIPTION OF THE DRAWING FIGURES

The following detailed description of exemplary embodiments when examined along with the included drawings provides the best comprehension of the scope of the present disclosure. The following Figures are contained in the drawings:

FIG. 1 displays a high-level system architecture for subscribing to action plans in accordance with exemplary embodiments;

FIG. 2 contains a block diagram displaying an example processing device of the system of FIG. 1 for subscribing to action plans in accordance with exemplary embodiments;

FIGS. 3A-3G form a flow chart exhibiting a process for subscribing to action plans in accordance with exemplary embodiments;

FIG. 4A exhibits an example RFP message generated in the system 100 in accordance with exemplary embodiments;

FIG. 4B exhibits an example action plan transaction message generated in the system 100 in accordance with exemplary embodiments;

FIG. 4C exhibits an example action plan notice generated in the system 100 in accordance with exemplary embodiments;

FIG. 4D exhibits an example client bid generated in the system 100 in accordance with exemplary embodiments;

FIG. 4E exhibits an example escrow payment notice generated in the system 100 in accordance with exemplary embodiments;

FIG. 4F exhibits an example encrypted action plan summary transaction message generated in the system 100 in accordance with exemplary embodiments;

FIG. 4G exhibits an example encrypted action plan update transaction message generated in the system 100 in accordance with exemplary embodiments;

FIG. 5 exhibits an example action plan data table, an example category table and an example subject table in accordance with exemplary embodiments;

DETAILED DESCRIPTION

Current art connects an analyst skilled in a particular field with a subscribing client. However, if the subscribing client wishes to receive the deliverable from the analyst's services (e.g., a prediction or advised action) privately with a period of exclusivity, current art does not provide a trusted means for non-subscribing parties to verify the content of the analyst's deliverable and thereby judge its quality, particularly if it pertains to a matter transpiring before the end of the exclusivity period (e.g., a meteorological forecast or an election outcome). This hampers future marketing of the analyst's services to such parties. Exemplary embodiments of the methods, systems, and computer program products provided for herein address this by first publishing to a blockchain the analyst's deliverable encrypted in the public key of the subscribing client who is able to decrypt and utilize it. After expiration of the exclusivity period, the analyst deliverable is published unencrypted to the blockchain, and non-subscribing parties can encrypt it using the subscribing client's public key to verify that it matches the original publication. The authenticated deliverable can then be reviewed and its quality determined.

Glossary of Terms

Blockchain—A distributed, immutable register of sequential data records. A network of one or more computing nodes can collectively operate and administer a blockchain by validating the addition of new data records ("blocks") to the blockchain using techniques such as proof of work, proof of stake or other appropriate means. Each new block can include a verification data field that is calculated based on data from the prior block, thereby "chaining" them and preventing modifications to the blockchain. The information in the blocks can include financial transaction data, supply chain data, the number of tokens held by an entity or "address", identity credentials or any other type of data.

System for Subscribing to Action Plans

Figure 1:
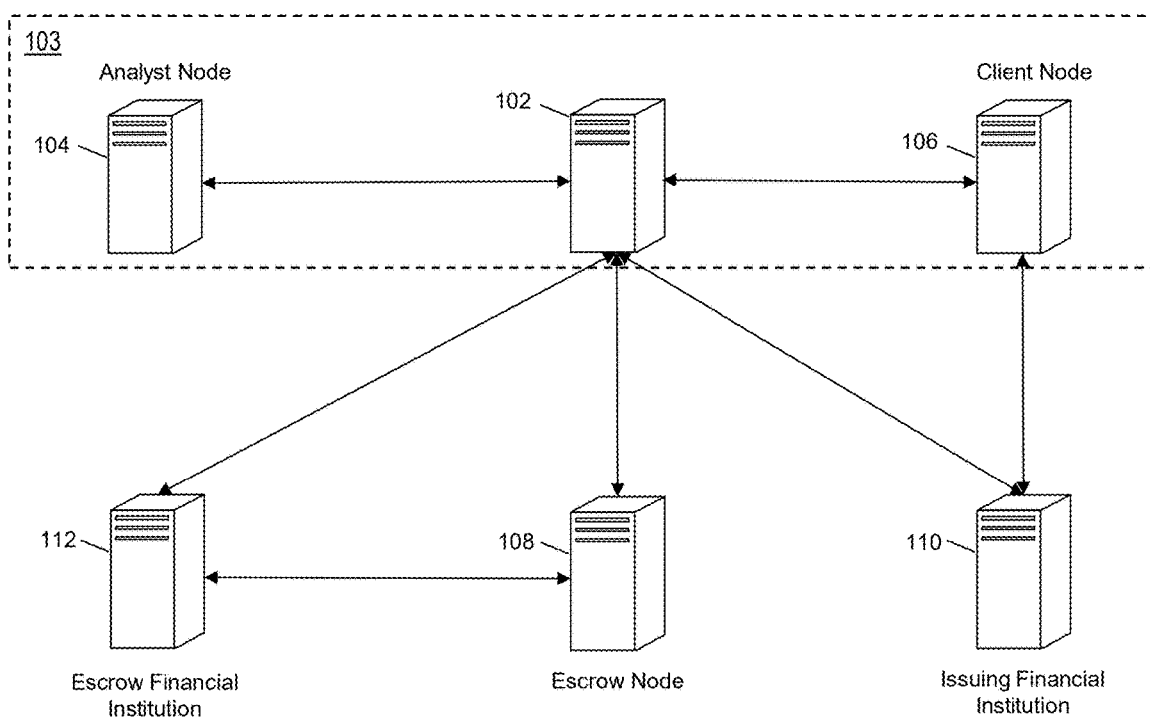

FIG. 1 displays system 100 for subscribing to action plans in accordance with exemplary embodiments.

The processing device 102 may be a computational system, a stationary computing device, a mobile computing device or any instrument that can save, assemble and arrange sound, visual data or text and exchange such information with other computing devices such as the analyst node 104, the client node 106, the escrow node 108, the issuing financial institution 110 and/or the escrow financial institution 112. For example, the processing device 102 may be any electronic instrument or computing system custom programmed to execute the functions expounded herein, such as the computing system 700 displayed in FIG. 7. The processing device 102 is expounded further referencing FIG. 2.

The analyst node 104 is a computing device associated with an analyst who develops action plans as expounded further below referencing FIGS. 3A-7. For example, the analyst node 104 can be associated with a financial analyst such as, but not limited to, an equity research analyst, a fixed income analyst, a commodities analyst, industry research analyst, etc. While financial analysts and associated investment transaction plans are described in detail, it can be appreciated that any type of action plan is within the scope of the present disclosure. For example, the analyst node 104 may be associated with a pharmaceutical analyst, a government policy analyst, a meteorological analyst, a real estate analyst, a video game analyst or any other type of analyst who may generate an action plan, e.g., a recommended transaction, for a client. The analyst node 104 may be a computational system, a stationary computing device, a mobile computing device or any instrument that can save, assemble and arrange sound, visual data or text and exchange such information with other computing devices such as the processing device 102, the client node 106, the escrow node 108, the issuing financial institution 110 and/or the escrow financial institution 112. For example, the analyst node 104 may be any electronic instrument or computing system custom programmed to execute the functions expounded herein, such as the computing system 700 displayed in FIG. 7. Although a single analyst node 104 is shown, the system 100 can include any number of analyst nodes 104.

The client node 106 is a computing device associated with a user seeking an action plan from the analyst node 104 as expounded further below referencing FIGS. 3A-7. For example, the client node 106 may be associated with a user seeking investment advice such as but not limited to, financial security purchase or sale recommendations, portfolio management recommendations or any other type of investment recommendation. The client node 106 may be a computational system, a stationary computing device, a mobile computing device or any instrument that can save, assemble and arrange sound, visual data or text and exchange such information with other computing devices such as the processing device 102, the analyst node 104, the escrow node 108, the issuing financial institution 110 and/or the escrow financial institution 112. For example, the client node 106 may be any electronic instrument or computing system custom programmed to execute the functions expounded herein, such as the computing system 700 displayed in FIG. 7. Although a single client node 106 is shown, system 100 can include any number of client nodes 106.

The system 100 includes blockchain network 103. The blockchain network 103 may consist of multiple blockchain nodes such as any number of the processing device 102, the analyst node 104 and/or the client node 106, with each potentially a computing system as displayed in FIG. 7. The blockchain nodes collectively operate and administer the blockchain by producing data, creating data blocks, validating blockchain transactions and confirming digital signatures. The processing device 102, the analyst node 104 and/or the client node 106, discussed further below, may be configured to generate, subscribe to and process action plans utilizing the network 103.

The blockchain may be a distributed register composed of multiple blocks, each with a block header and data content. The block header can include fields such as a timestamp, a block verification value and a data verification value. The timestamp may specify when the block was created in any appropriate format (e.g., Posix time, etc.). The block verification value can be generated using data from a block previously added to the blockchain. In an exemplary embodiment, the block verification value can be created by applying a computation algorithm such as a hashing function to the block header of the block most recently appended to the blockchain. The data verification value can be generated from the data content of the block. In an exemplary embodiment, the data verification value can be created by applying a computation algorithm such as a binary hash tree function to the data content of the block.

The immutable nature of a blockchain stems from the presence of the block verification value and the data verification value in the block header. If any data in a block is altered, then the data verification value in that block's block header would need to be updated. However, this would mean that for each subsequent block, the block verification value would also need to be updated. Each node of the blockchain network 103 would need to execute these updates to the altered block and all subsequent blocks to process the data alteration, otherwise the integrity of the block verification value for newly added blocks would be compromised. The degree of computational and co-ordinational difficulty for implementing such a change across a distributed network would be very high, making it improbable and thereby upholding immutability.

In some embodiments, the data content of a block in a blockchain can be utilized to record transactions between two blockchain accounts, e.g., between the analyst node 104 and the client node 106. A transaction can be authorized by a blockchain account through a digital signature that is produced using the private key of the account's cryptographic public-private key pair, and can be authenticated by a blockchain network such as network 103 through application to the digital signature of the public key of the account's cryptographic public-private key pair. "Blockchain account" can be synonymous with the private key itself or a computing device that holds a private key and deploys it for blockchain transactions (e.g., the processing device 102, the analyst node 104 and/or the client node 106). A computing device can be a computational system, a stationary computing device, a mobile computing device or any instrument that can hold and operate a blockchain account.

The data content of a block can contain any type of information, including blockchain transaction records. Each transaction may have one or more components, including a digital signature based on the private key of the initiator (e.g., the analyst node 104), a blockchain address derived from the public key of the transaction counterparty (e.g., the client node 106) and the underlying transaction data. The transaction can also incorporate a blockchain address (e.g., an "output address") where the initiator has saved data (e.g., "unspent transactions") received from prior transactions, a blockchain address based on the initiator's public key for recording changes or the initiator's public key for use in transaction validation. Either party to the transaction can present the transaction data to a node of the blockchain network 103 who can "confirm" the transaction by validating the initiator's digital signature using the initiator's public key and authenticating the initiator's access to the saved data. Once confirmed, the transaction can be incorporated into a new block which can be validated by other blockchain network 103 nodes, and then appended to the blockchain for all nodes to receive and view.

The system 100 may include an escrow node 108. The escrow node 108 may be a computational system, a stationary computing device, a mobile computing device or any instrument that can save, assemble and arrange sound, visual data or text and exchange such information with other computing devices such as the processing device 102, the analyst node 104, the client node 106, the issuing financial institution 110 and/or the escrow financial institution 112. For example, the escrow node 108 may be any electronic instrument or computing system custom programmed to execute the functions expounded herein, such as the computing system 700 displayed in FIG. 7. In an exemplary embodiment, the escrow node 108 can facilitate the exchange of assets between a blockchain network node such as the processing device 102, the analyst node 104 and/or the client node 106, and the escrow financial institution 112.

The escrow financial institution 112 may be a financial institution or other entity that holds escrow accounts that can custody or exchange assets. In an exemplary embodiment, the processing device 102 may have an escrow account with the escrow financial institution 112 for keeping assets exchanged in the system 100 between the client node 106 and the analyst node 104.

The issuing financial institution 110 may be a financial institution or other entity that holds accounts that can custody or exchange assets. The issuing financial institution 110 may issue a payment instrument to the client node 106, such as a blockchain token wallet address or an ACH routing number and account number combination that can be provided to other parties to facilitate payment transactions with the account for client node 106 held at the issuing financial institution 110.

The processing device 102, the analyst node 104, the client node 106, the escrow node 108, the issuing financial institution 110 and/or the escrow financial institution 112 may communicate via any network capable of executing the functions disclosed herein, including a wired network (e.g., wide area or local area Ethernet), a wireless electromagnetic signal network (e.g., near-field communication, cellular, Wi-Fi, Bluetooth), physical cabling, a composite of network types or any other fitting network type evident to those with proficiency in the pertinent art. Note, a network may not be necessary depending upon the setup of the processing device 102, the analyst node 104, the client node 106, the escrow node 108, the issuing financial institution 110 and/or the escrow financial institution 112.

Processing Device

Figure 2:
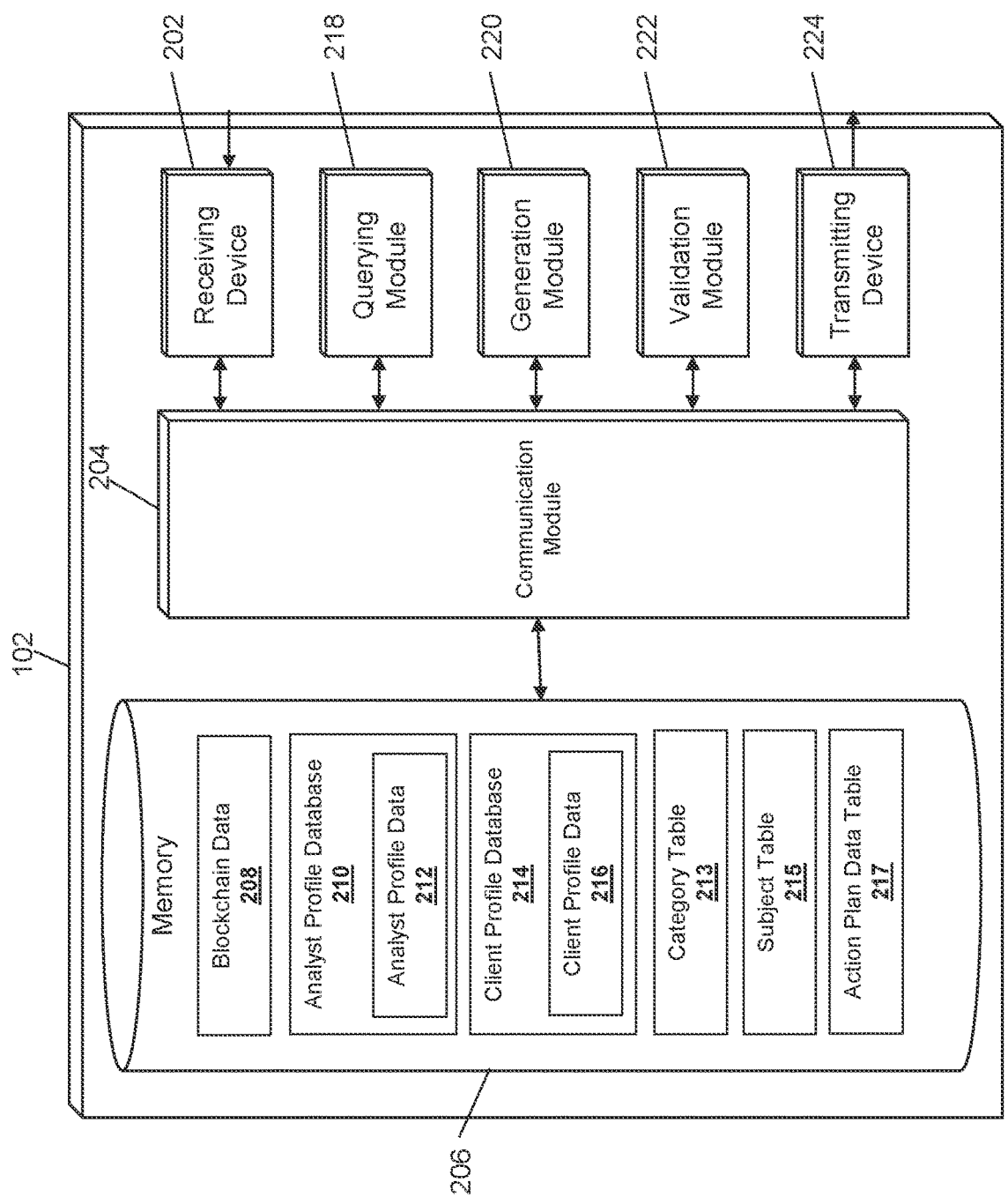

An embodiment of the processing device 102 in the system 100 is displayed in FIG. 2, however, this does not exhaust the potential constructs of the processing device 102 capable of executing the functions expounded herein, as evident to those with proficiency in the pertinent art. The computer system 700 displayed in FIG. 7 and discussed further below, for example, represents one appropriate structure of the processing device 102. Blockchain nodes in the network 103 portrayed in FIG. 1 such as the analyst node 104 and/or the client node 106 can in some embodiments be designed to execute the functions expounded herein utilizing components of the processing device 102 depicted in FIG. 2.

The processing device 102 can have a receiving device 202 that may be programmed to accept data transmitted through a network protocol from sources such as the analyst node 104, the client node 106, the escrow node 108, the escrow financial institution 112, the issuing financial institution 110 and other nodes of the blockchain network 103 via communication mechanisms such as wired network connectivity (e.g., wide area or local area Ethernet), wireless electromagnetic signals (e.g., near-field communication, cellular, Wi-Fi, Bluetooth), etc. In some embodiments, the receiving device 202 can consist of more than one component, with each component specializing in accepting data from a specific communication mechanism. The receiving device 202 can accept data signals sent electronically, with such signals capable of being overlayed or embedded with data that is processed by the receiving device 202 (e.g., via a digestion or parsing module or custom designed program) into a form suitable for the processing device 102 to execute the functions expounded herein.

The receiving device 202 can be programmed to receive data signals from the analyst node 104 and the client node 106 that are sent electronically, with such signals capable of being overlayed or embedded with data that is utilized to produce and administer the blockchain, including but not limited to, blockchain transactions awaiting confirmation, blockchain transactions that have been confirmed, newly generated blocks awaiting validation, blocks validated for blockchain addition, block confirmation messages, public keys, digital signatures, etc.

The processing device 102 can have a communication module 204 that can be programmed to facilitate data exchange among the components of the processing device 102 such as the modules, databases and memories that drive implementation of the functions expounded herein. The communication module 204 may consist of various mechanisms and protocols that facilitate communication inside the processing device 102—such as interconnects, socket and pin headers and cables—as well as externally with peripherals such as storage systems, output units, data entry equipment, etc. The processing device can also have mechanisms and modules (e.g., the querying module 218, the generation module 220 and the validation module 222) that utilize software and/or hardware to execute functions by receiving data, taking steps based upon the data and then transmitting the result to the appropriate destination. The operation of the modules will be evident to those with proficiency in the pertinent art, as set forth in this disclosure.

The processing device 102 can have a memory 206 that may be programmed to save data that the processing device 102 will utilize in executing the functions expounded herein, including encryption instruments (e.g., cryptographic public-private key pairs, procedures to perform encryptions, symmetric keys, etc.), guidelines for communication mechanisms, guidelines for data configuration, module executables, algorithms to produce and verify digital signatures, algorithms to produce block verification values and data verification values via hashing, data that is utilized to produce and administer the blockchain, communication information for the analyst node 104, the client node 106, the escrow node 108, the escrow financial institution 112, the issuing financial institution 110 and/or the blockchain network 103 and any data requisite for the processing device 102 to execute the functions expounded herein, as evident to those with proficiency in the pertinent art. In some embodiments, a relational database can be saved in the memory 206, with accompanying keyword-based instructions that enable the manipulation of the stored data. The memory 206 can be programmed to record data in the appropriate configuration in a variety of media such as static random access memory (SRAM), dynamic random access memory (DRAM), programmable read-only memory (PROM), electrically erasable programmable read-only memory (EEPROM), etc.

The processing device 102 can have blockchain data 208, which may for example reside in the memory 206 of the processing device 102 or a similarly accessible location. The blockchain data 208 can consist of a blockchain with multiple blocks such as the blockchain network 103 and data that is utilized to produce and administer the blockchain, including algorithms to produce blocks, algorithms to produce and verify digital signatures, interaction data for nodes of the blockchain (e.g., the processing device 102, the analyst node 104 and the client node 106), token mining information, blockchain account data such as history of complete and incomplete transactions, request for action plans messages, action plan transactions, winning bid transactions, escrow payment transactions, encrypted action plan summary transactions, unencrypted action plan summary transactions, encrypted action plan update transactions and unencrypted action plan update transactions.

The processing device 102 may also include analyst profile database 210, which can for example reside in the memory 206 of the processing device 102 or a similarly accessible location. The analyst profile database 210 includes analyst profile data 212, with the data pertaining to a particular analyst node 104 assembled into an analyst profile. The analyst profile data 212 includes, but is not limited to an analyst identification (e.g., a name or identification number), one or more analyst category track record values (e.g., the average performance generated by the analyst's prior action plans in a category), one or more category identifications for the one or more categories in which the analyst is experienced (e.g., semiconductor equity securities, corporate debt securities, natural resource exploration, video gaming, etc.), a count of the number of invalid unencrypted action plan summary transaction messages submitted by the analyst, a count of the number of invalid unencrypted action plan update transaction messages submitted by the analyst, the analyst public key of an analyst cryptographic key pair and analyst financial institution account payment instrument information (e.g., a blockchain token wallet address or an ACH routing number and account number combination), etc. The analyst profile data 212 may be stored in any type of database evident to those with competency in the pertinent art that facilitates information storage and retrieval (e.g., relational, object, etc.).

The processing device 102 may also include client profile database 214, which can for example reside in the memory 206 of the processing device 102 or a similarly accessible location. The client profile database 214 includes client profile data 216, with the data pertaining to a particular client node 106 assembled into a client profile. The client profile data 216 includes, but is not limited to a client identification (e.g., a name or identification number), one or more category identifications for the one or more categories in which the client is interested (e.g., semiconductor equity securities, corporate debt securities, natural resource exploration, video gaming, etc.), the client public key of a client cryptographic key pair, client financial account payment instrument information (e.g., a blockchain token wallet address or an ACH routing number and account number combination), etc. The client profile data 216 may be stored in any type of database evident to those with competency in the pertinent art that facilitates information storage and retrieval (e.g., relational, object, etc.).

The processing device 102 may also include action plan data table 217, which can for example reside in the memory 206 of the processing device 102 or similarly accessible location. The action plan data table 217 may include one or more columns such as, but not limited to, a plan identification column, an analyst identification column, a category identification column, one or more client identification columns (e.g., a client identification column for each client that submits a winning client bid), one or more winning client bid amount columns (e.g., a winning client bid amount column associated with each client identification column that contains the bid amount for the winning client bid associated with the client identification), an escrow column, a paid column (e.g., how much of the sum of the bid amounts from the winning client bids has been paid to the analyst), a subject identification column, a tilt value column, a plan conviction value column, a start time column, a start value column, an end time column, an end value column and a plan return value column, etc. An example action plan data table 502 is shown in FIG. 5 and is expounded further below referencing FIGS. 3A-3G and 5. The action plan data table 217 may be stored in any type of database evident to those with competency in the pertinent art that facilitates information storage and retrieval (e.g., relational, object, etc.).

The processing device 102 may also include a category table 213, which can for example reside in the memory 206 of the processing device 102 or similarly accessible location. The category table 213 may include one or more columns such as, but not limited to, a category identification column, a category name column, a start value function column which contains instructions—or information on where to locate instructions—for calculating a start value for a subject identification in the category, an end value function column which contains instructions—or information on where to locate instructions—for calculating an end value for a subject identification in the category, a plan return function column which contains instructions—or information on where to locate instructions—for calculating a plan return for action plans with a subject identification in the category, etc. An example category table 504 is shown in FIG. 5 and expounded further below referencing FIGS. 3A-3G and 5. The category table 213 may be stored in any type of database evident to those with competency in the pertinent art that facilitates information storage and retrieval (e.g., relational, object, etc.).

The processing device 102 may also include a subject table 215, which can for example reside in the memory 206 of the processing device 102 or similarly accessible location. The subject table 215 may include one or more columns such as, but not limited to, a subject identification column, a subject name column, a category identification column that indicates the category to which the subject belongs, etc. An example subject table 506 is shown in FIG. 5 and expounded further below referencing FIGS. 3A-3G and 5. The subject table 215 may be stored in any type of database evident to those with competency in the pertinent art that facilitates information storage and retrieval (e.g., relational, object, etc.).

The processing device 102 can have a querying module 218 that locates specific information within a target database. The querying module 218 accepts as input a query in the form of a data expression such as a text string, searches for information in the target database (e.g., memory 206 of the processing device 102) that matches the query and sends the result of the search to the appropriate destination in the processing device 102 (e.g., another module). For example, the querying module 218 could perform a query on the memory 206 to find analyst profile data 212, client profile data 216, blockchain data 208, a client request for action plans message, an action plan transaction message, an action plan transaction, an action plan notice, one or more client bids to be used in determining a winning client bid, a winning bid transaction, a winning bid notification, a client financial account for use in executing an escrow payment, escrow account information used for transmitting a client escrow payment, an escrow payment notice, an encrypted action plan summary transaction message, an encrypted action plan summary transaction, an encrypted action plan summary notice, an unencrypted action plan summary transaction message, an unencrypted action plan summary transaction, an encrypted action plan update transaction message, an encrypted action plan update transaction, an encrypted action plan update notice, an unencrypted action plan update transaction message, an unencrypted action plan update transaction, an analyst financial account for receiving payment for an action plan, etc.

The processing device 102 can have a generation module 220 that produces data that the processing device 102 can utilize to execute the functions expounded herein. The generation module 220 may receive directions, follow the directions to produce data and then send the data to the appropriate destination in the processing device 102 (e.g., another module). For example, the generation module 220 can be programmed to produce an action plan transaction, an action plan notice, a winning bid transaction, an escrow payment transaction, an encrypted action plan summary transaction, an encrypted action plan summary notice, an unencrypted action plan summary transaction, an encrypted action plan update transaction, an encrypted action plan update notice, an unencrypted action plan update transaction and data that is utilized to produce and administer the blockchain such as block headers, data content, block verification values, data verification values (e.g., blockchain data 208), etc.

The processing device 102 can have a validation module 222 that conducts validations that are essential to executing the functions expounded herein. The validation module 222 may receive directions and/or target data values, conduct the validation per the directions and send the result to the appropriate destination in the processing device 102 (e.g., another module). The validation module 222 can be programmed to confirm blockchain transactions by authenticating the initiator's permission to use included data such as transaction outputs and ensuring that these outputs have not already been utilized in other transactions. The validation module 222 can also be programmed to validate digital signatures (e.g., through application of the cryptographic public-private key pair's public key), client request for action plans messages, action plan transaction messages, client bids, escrow payment transactions, encrypted action plan summary transaction messages, unencrypted action plan summary transaction messages, unencrypted plan information, encrypted action plan update transaction messages, unencrypted action plan update transaction messages, unencrypted plan update information and digital signatures, etc.

The processing device 102 can have a transmitting device 224 that may be programmed to send data through a network protocol to sources such as the analyst node 104, the client node 106, the escrow node 108, the escrow financial institution 112, the issuing financial institution 110 and other nodes of the blockchain network 103 via communication mechanisms such as wired network connectivity (e.g., wide area or local area Ethernet) or wireless electromagnetic signals (e.g., near-field communication, cellular, Wi-Fi, Bluetooth), etc. In some embodiments, the transmitting device 224 can consist of more than one component, with each component specializing in sending data via a specific communication mechanism. The transmitting device 224 can send data signals electronically, with such signals capable of being overlayed or embedded with data (e.g., via a dedicated encoding module) into a form suitable for sending to a receiving device that can process it.

The transmitting device 224 can be programmed to send data signals electronically to the nodes of the blockchain network 103 such as the analyst node 104, the client node 106, the escrow node 108, the escrow financial institution 112 and/or the issuing financial institution 110, with such signals capable of being overlayed or embedded with client request for action plans messages, action plan transaction messages, action plan notices, one or more client bids to be used in determining a winning client bid, winning bid notifications, escrow payment transactions, escrow payment notices, encrypted action plan summary transactions, encrypted action plan summary notices, unencrypted action plan summary transactions, encrypted action plan update transactions, encrypted action plan update notices, unencrypted action plan update transactions and data that is utilized to produce and administer the blockchain such as block headers, data content, block verification values, data verification values (e.g., blockchain data 208), etc.

Exemplary Process for Subscribing to Action Plans

FIGS. 3A-3G exhibit a process 300 for subscribing to action plans in the system 100 of FIG. 1 in accordance with exemplary embodiments.

In step 302 the client node 106, e.g., an investor, generates a request for action plans (RFP) message, e.g., a request for one or more action plans. The RFP message generated by the client node 106 is a message that informs the analyst nodes 104 of the system 100 that the client node is seeking action plans (e.g., recommended investment transactions) and may include one or more data fields such as, but not limited to, a client identification (e.g., an identification of the client node 106), a time (e.g., a date and time the RFP message is generated and/or a date and time the RFP message expires), an RFP identification (e.g., an identification value associated with the RFP message), a category identification (e.g., an identification of a field in which action plans are being sought), a description of plan preferences (e.g., industry sector, plan execution location and/or time horizon) and a client digital signature (e.g. a hash of the RFP message encrypted with a private key of the client node 106). FIG. 4A illustrates an example RFP message 450 having six data fields. In the RFP message 450, a first data field identifies the client node 106 as "Client A;" a second data field identifies the date and time the RFP message 450 was generated; a third data field identifies an RFP identification value of "20001," which may identify the RFP message 450 and may later be used to refer to the RFP message 450; a fourth data field contains a category identification of "001" which refers to Semiconductor Equity Securities, indicating the client node is seeking action plans involving semiconductor equity securities; a fifth data field contains a brief description of the RFP message 450 indicating the client node 106 is specifically seeking action plans involving semiconductor equity securities of companies based in North America; and a sixth data field contains a client digital signature.

In step 304, a transmitting device of the client node 106 transmits the RFP message (e.g., the RFP message 450), to the processing device 102. The client node 106 may transmit the RFP message via a network (e.g., the Internet or any other suitable communication method). In step 306, the receiving device 202 of the processing device 102 receives the RFP message from the client node 106. Further, the transmitting device 224 of the processing device 102 transmits the RFP message to the analyst node 104. The processing device 102 may transmit the RFP message via a network (e.g., the Internet or any other suitable communication method). For example, the processing device 102 functions as a central node in the system 100 to process communications between and among each analyst node 104 and each client node 106 of the system 100. In an embodiment of the system 100, the analyst node 104 and the client node 106 may communicate directly, e.g., the client node 106 may transmit an RFP message directly to each analyst node 104 in the system 100 via a network (e.g., the Internet or any other suitable communication method). Further, the processing device 102 can receive a plurality of RFP messages from one or more client nodes 106 and transmit the plurality of client messages to the analyst node 104. In an embodiment, the one or more RFP messages received by the processing device 102 may be held and transmitted to the analyst node 104 at a pre-determined time, e.g., every day at a certain time. In an embodiment, the processing device 102 identifies one or more analyst nodes 104 to transmit the RFP message to (e.g., based on the category identification of the RFP message matching a category identification in the analyst profile data 212). For example, the processing device 102 may identify one or more analyst nodes 104 based on the one or more analyst profiles stored in the analyst profile database 210 indicating that those one or more analyst nodes 104 specialize in semiconductor equity securities.

In step 308, a receiving device of the analyst node 104 receives the RFP message. In step 310, the analyst node 104 generates an action plan transaction message (e.g., notification of a recommended action plan). The action plan transaction message generated by the analyst node 104 may include one or more data fields such as, but not limited to, an analyst identification (e.g., an identification of the analyst node 104), a plan conviction value (e.g., a value on a scale of one to ten indicating the analyst's conviction that the plan will achieve the desired outcome), a category identification (e.g., the field to which the action plan applies), an analyst category track record value (e.g., the average performance generated by the analyst's prior action plans in the category referenced by the category identification), an RFP identification (e.g., if the action plan is in response to an RFP message), an e-signed attestation that no analyst associated with the analyst node 104 illegally possesses any information and an analyst digital signature (e.g., a hash of one or more data fields of the action plan transaction message encrypted with a private key of the analyst node 104). The action plan transaction message does not include a description of the underlying action plan since it is not disclosed until after identification of a winning client bid or bids as discussed below. The action plan transaction message may be generated in response to the RFP message (e.g., the RFP message 450), or the action plan transaction message may be generated independently of any RFP message, i.e., not in response to any specific RFP message. FIG. 4B illustrates an example action plan transaction message 452 having seven data fields. The action plan transaction message 452 illustrated in FIG. 4B is an example action plan transaction message 452 in response to the RFP message 450. In the action plan transaction message 452, a first data field identifies the analyst node 104 as "Analyst B;" a second data field indicates the plan conviction value that the analyst node 104 attributes to the action plan referenced by the action plan transaction message 452 (e.g., a seven on a scale of one to ten); a third data field indicates a category of "001", indicating the action plan involves transacting (e.g., buy or sell) with semiconductor equity securities; a fourth data field indicates the category track record of the analyst node 104 (e.g., the prior action plans submitted by the analyst node 104 in the category "001" have generated an average excess return of 10%, where the excess return is the result of annualizing the difference between the action plan's absolute performance and the performance of the benchmark over the action plan's execution period); a fifth data field indicates an RFP message identification of "20001," indicating the action plan transaction message 452 is in response to RFP message 450; a sixth data field contains the e-signed attestation that no analyst associated with the analyst node 104 illegally possesses any information and a seventh data field contains an analyst digital signature (e.g., a digital signature associated with the analyst node 104).

In step 312, a transmitting device of the analyst node 104 transmits the action plan transaction message to the processing device 102. While only a single action plan transaction message is illustrated, it can be appreciated that the analyst node 104 may transmit any number of action plan transaction messages. For example, the analyst node 104 may respond to more than one RFP message with a different action plan transaction message or the analyst node may generate a plurality of action plan transaction messages independent of any RFP message. In an embodiment, any action plan transaction message must be submitted by the analyst node 104 to the processing device 102 prior to a pre-determined time each day. For example, the action plan transaction message may refer to an investment transaction recommendation and the action plan transaction message must be submitted to the processing device 102 by a certain time during market trading hours, e.g., by 1:45 pm EST. The analyst node may transmit the action plan transaction message via a network (e.g., the Internet or any other suitable communication method). In an embodiment, the action plan transaction message further includes a data field indicating a number of winning client bids (e.g., a number of winning client bids that are allowed for the action plan). For example, the action plan transaction message can allow up to a total of three winning client bids. Further, the action plan transaction message can limit the number of winning client bids allowed for each client node 106. Following the example above, in which three total winning client bids are allowed, the action plan transaction message may limit each client node 106 to a single winning client bid, two winning client bids, or all three winning client bids.

In step 314, the receiving device 202 of the processing device 102 receives the action plan transaction message (e.g., the action plan transaction message 452), from the analyst node 104. In step 316, the processing device 102 generates an action plan transaction, e.g., a new block, in a blockchain, e.g., the blockchain network 103, including the one or more data fields of the action plan transaction message and a plan identification (e.g., a value generated to identify action plans).

In step 318, the transmitting device 224 of the processing device 102 transmits an action plan notice to the blockchain network 103. The action plan notice alerts all nodes, e.g., the analyst node 104 and the client node 106, of the blockchain network 103 of the action plan transaction, e.g., the new block of the blockchain. In an embodiment, the action plan notice is generated and transmitted using a smart contract (e.g., a computer program that self-initiates and runs upon manifestation of one or more predefined circumstances). The action plan notice includes the one or more data fields of the action plan transaction generated in step 316. FIG. 4C illustrates an example action plan notice 454 in accordance with exemplary embodiments. Further, the processing device 102 may create an action plan data table 217. An example action plan data table 502 is illustrated in FIG. 5, based on the data fields of the action plan transaction associated with the action plan transaction message 452. For example, the new row of the action plan data table 502 includes, but is not limited to, the plan identification, the analyst identification (e.g., the identification of the analyst node 104), the category identification and the plan conviction value. FIG. 5 illustrates an example action plan data table 502 having all fields completed as will be expounded further below referencing the remaining steps of the process 300.

Figure 3A:
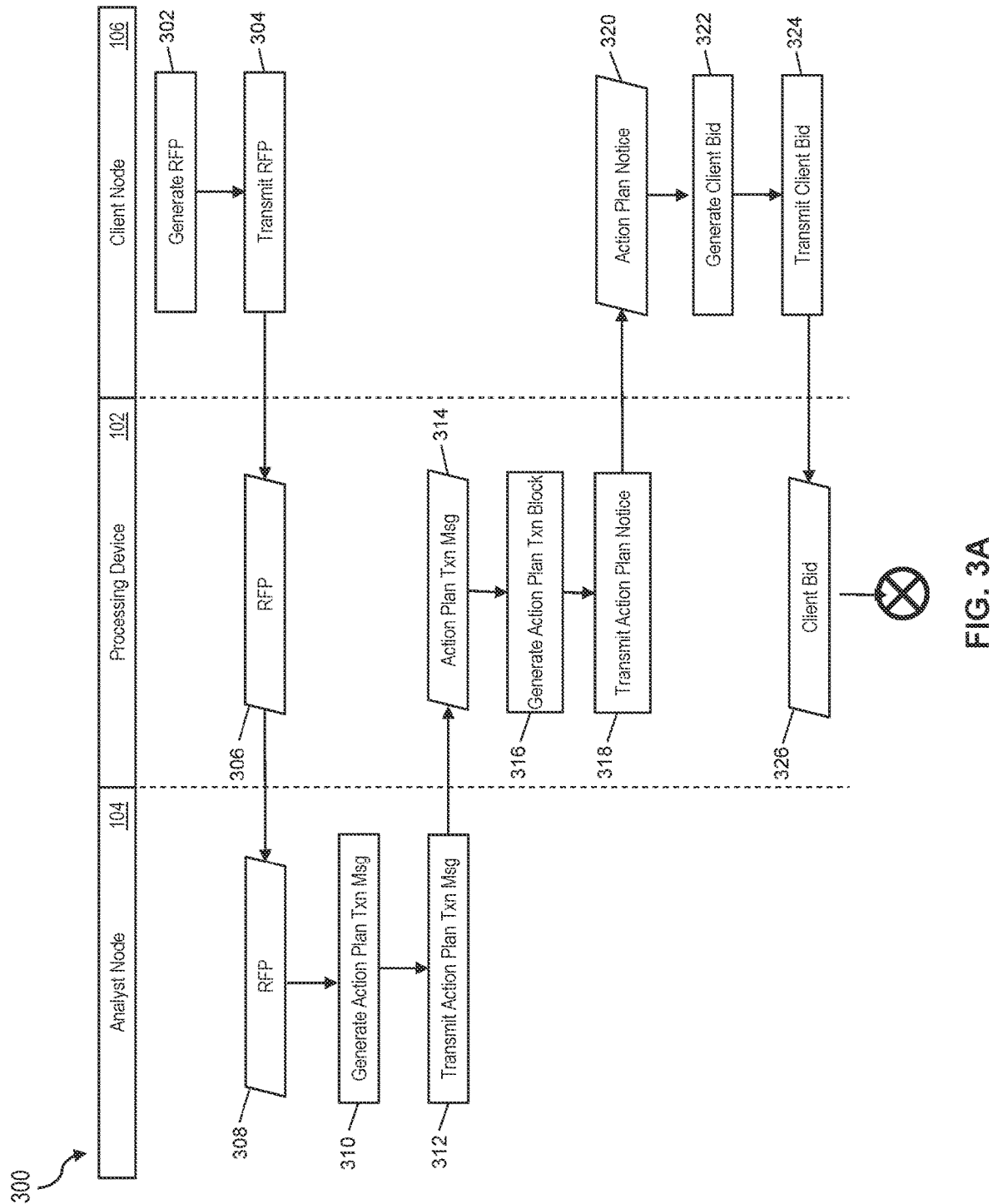
Figure 3C:
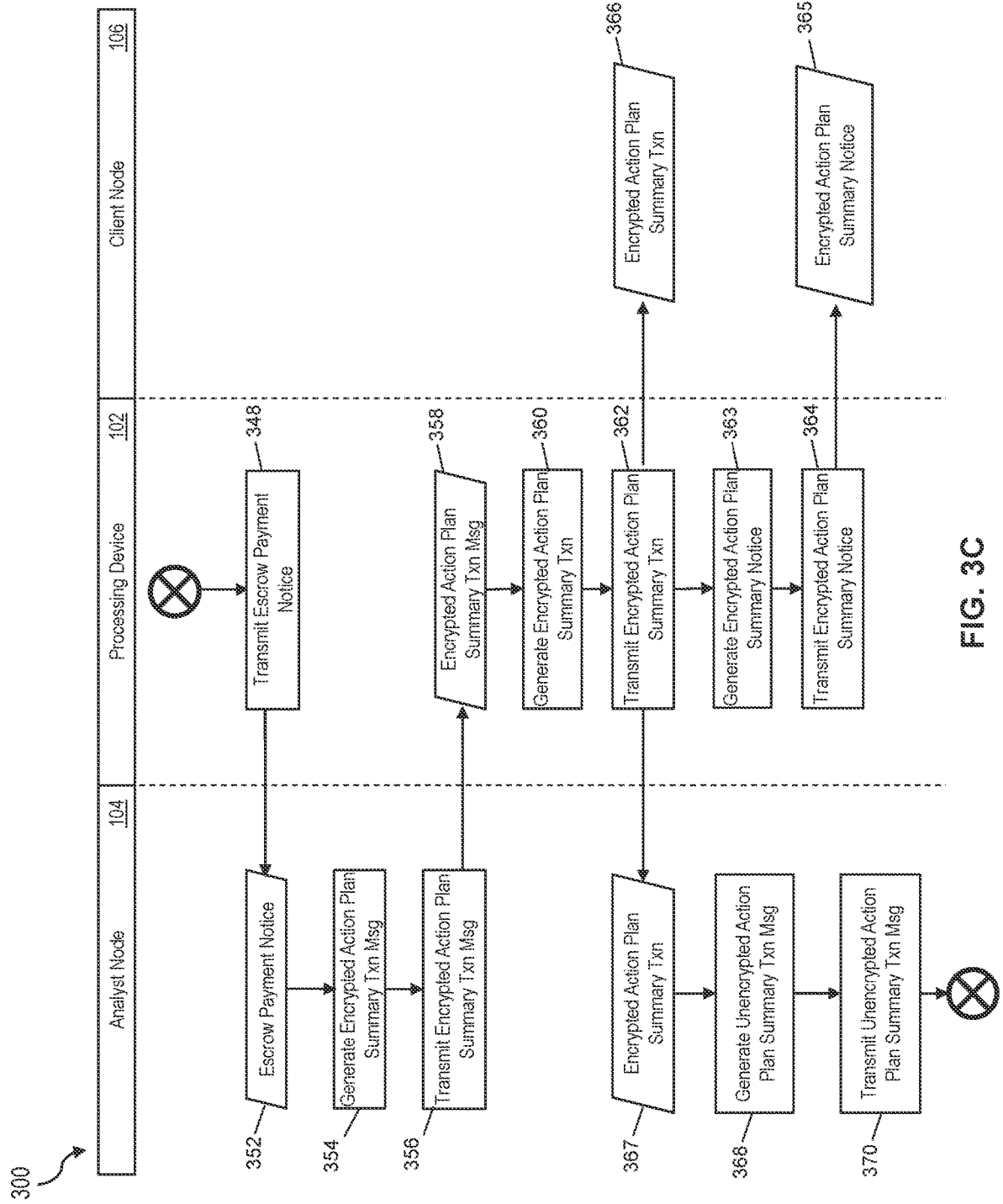
Figure 3D:
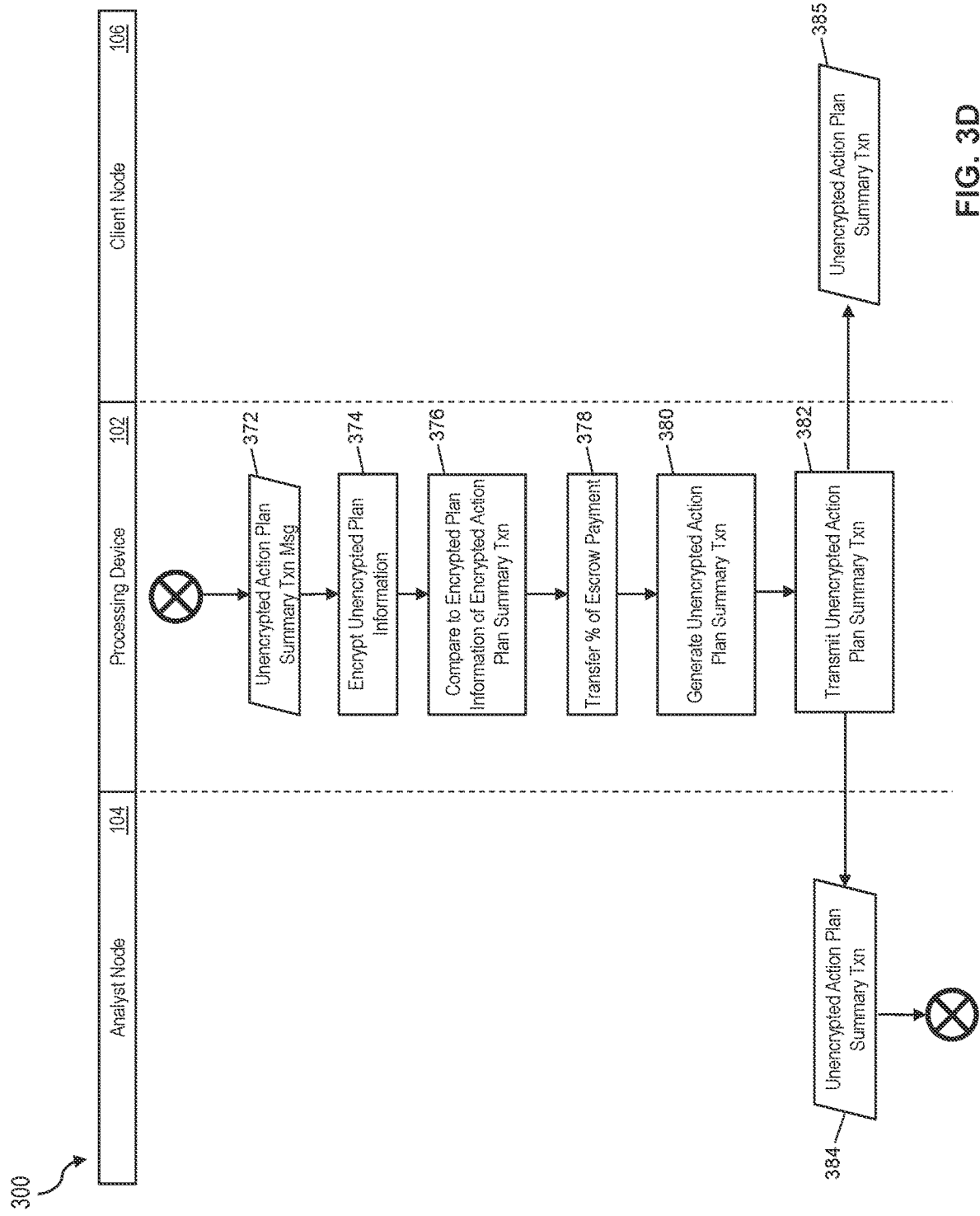
Figure 3F:
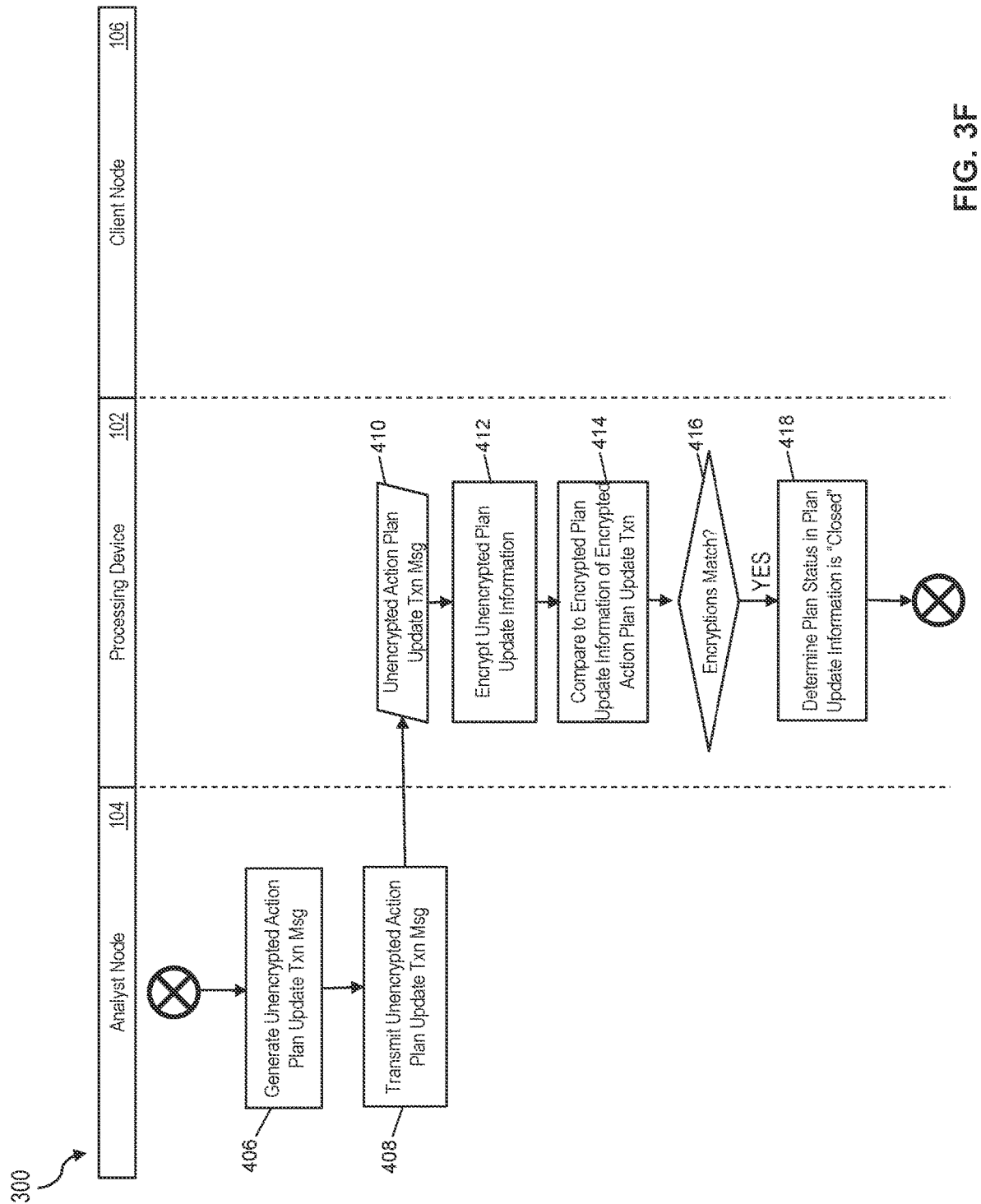
Figure 3G:
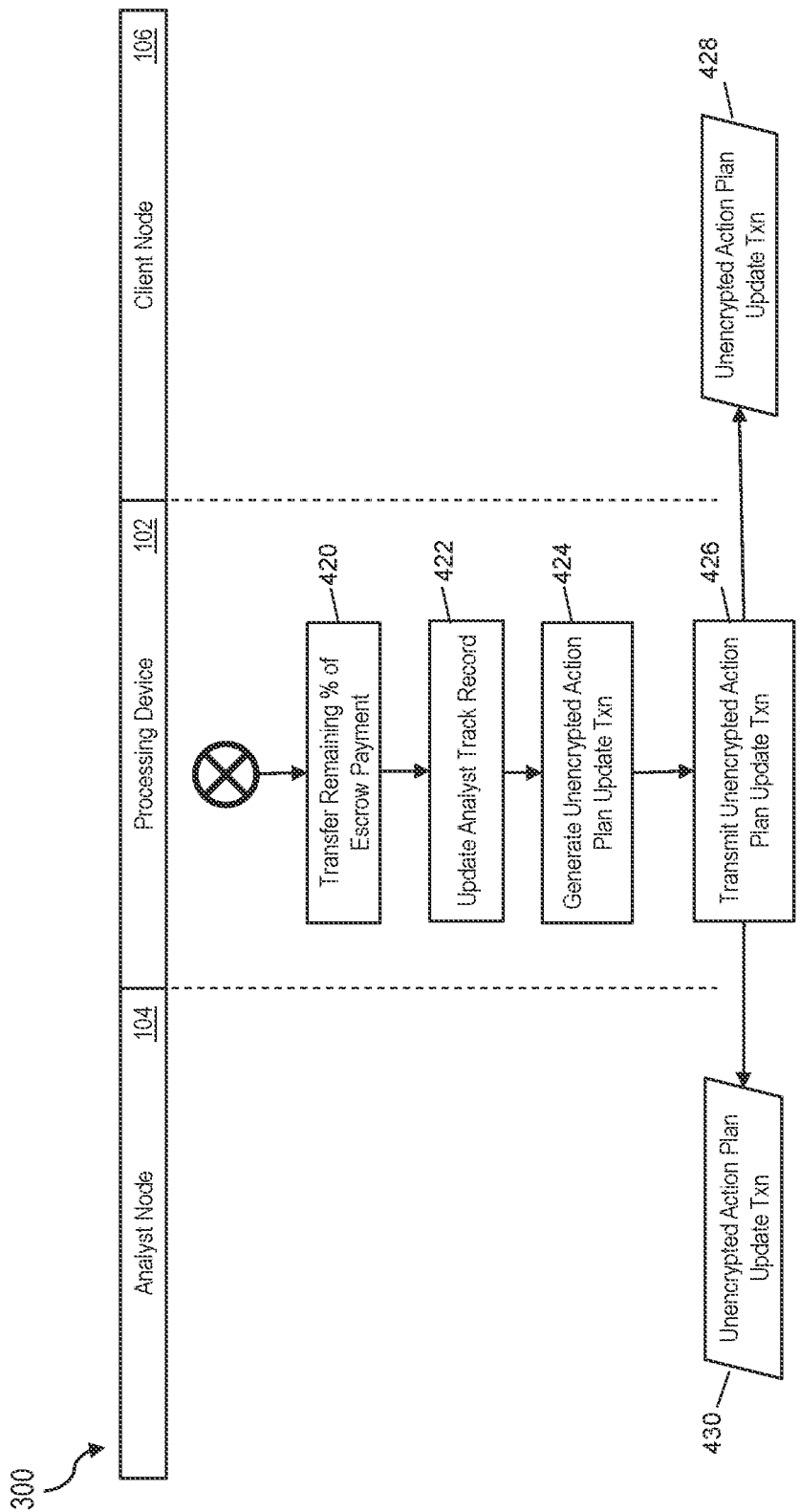

In step 320, a receiving device of the client node 106 receives the action plan notice, e.g., the action plan notice 454. In an embodiment, steps 314-320 are executed as quickly as practicable. In step 322, the client node 106 generates a client bid on the action plan transaction referenced by the action plan notice 454. The client bid includes one or more data fields such as, but not limited to, the plan identification, the client identification of the client node 106, a bid amount (e.g., a currency value or other tradeable value and/or asset), a public key associated with the client node 106 and a client digital signature of the client node 106. FIG. 4D illustrates an example client bid 456 generated in response to the action plan notice 454. For example, the client bid 456 includes a first data field listing the plan identification for which the client bid is for, a second data field containing the client identification (e.g., the identification of the client node 106), a third data field containing the bid amount (e.g., USD 100), a fourth data field containing the public key associated with the client node 106 and a fifth data field containing the client digital signature of the client node 106. While only a single client bid is illustrated in FIG. 3A, two or more client bids may be generated by one or more client nodes 106 in the system 100. For example, based on the winning client bid limit per client node defined in the action plan transaction message, a single client node 106 may submit two client bids. Alternatively, two separate client nodes 106 may each separately submit a single client bid.

In step 324, a transmitting device of the client node 106 transmits the client bid to the processing device 102. In an embodiment, the client bid must be transmitted by the client node 106 within a pre-determined time period after transmission of the action plan notice 454, e.g., ten minutes, an hour, or any other suitable time period. In step 326, the receiving device 202 of the processing device 102 receives the client bid for the action plan transaction from the client node 106. While only a single client bid is illustrated, it can be appreciated that any number of client bids can be received by the receiving device 202 of the processing device 102 from any number of client nodes 106 in the blockchain 103. For example, the receiving device 202 of the processing device 102 may receive two or more client bids from a single client node 106 or two or more client nodes 106 in the system 100. Alternatively, two separate client nodes 106 may each separately submit a single client bid.

In step 328, the processing device 102 determines a winning client bid of the one or more client bids received from the one or more client nodes 106. For example, the processing device 102 can sort all received client bids and identify a client bid containing the highest bid amount. Further, the processing device 102 may verify that the client node 106 associated with the highest bid amount has an account with sufficient assets to fund the client bid. For example, the processing device 102 can identify a client account in client profile data 216 stored in the client profile database 214 associated with the client node 106. In an embodiment, a smart contract is utilized to determine the winning client bid. In an embodiment in which more than one winning client bid is allowed, the processing device 102 determines the winning client bids. For example, if the action plan transaction message allows up to three winning client bids and the processing device receives five client bids, the processing device would determine the three client bids having the three highest bid amounts. As discussed above, a single client node 106 may have submitted more than one client bid, and that single client node 106 may have one or all of the highest client bids depending upon the limit set by the action plan transaction message. Further, in an embodiment where multiple winning client bids are allowed, the process 300 includes the processing device assigning a bid position to each client node 106 having a winning client bid. For example, if the action plan transaction message allows up to three winning client bids, a client node 106a may submit two client bids having the two highest bid amounts and a client node 106b may submit a client bid having the third highest bid amount. In that case, the client node 106a is assigned the first and second bid positions and the client node 106b is assigned the third bid position. Alternatively, if the action plan transaction message allows only a single winning client bid per client node 106, the processing device 102 would assign the first bid position to the client node 106a, the second bid position to the client node 106b, e.g., ignoring the second client bid from the client node 106a, and the third bid position to a third client node 106, e.g., client node 106c. In an embodiment, the distribution of the action plan described in steps 330-430 can be done in order based on bid position, with a pre-determined delay between each bid position (e.g., 1 day, 2 days, 1 week, etc.).

In step 330, the processing device 102 generates a winning bid transaction (e.g., a new block), in a blockchain (e.g., the blockchain network 103), using the one or more data fields of the winning client bid, e.g., the client bid 456, for the action plan transaction referenced by the action plan notice 454. For example, the winning bid transaction includes one or more data fields such as, but not limited to, the plan identification, the analyst identification of the analyst node 104, the client identification associated with the client node 106 of the winning client bid, the bid amount and the public key of the client node 106. Further, the processing device 102 updates the action plan data table 502 with the client identification of the client node 106 having the winning client bid and the bid amount of the winning client bid. In an embodiment having multiple winning client bids, the processing device 102 may include each winning client bid in a single winning bid transaction along with their assigned bid position or the processing device 102 may generate a separate winning bid transaction for each winning client bid along with the assigned bid position, and the action plan data table 502 is updated with the client identification and bid amount of each of the winning client bids.

In step 332, the transmitting device 224 of the processing device 102 transmits a winning bid notification to the client node 106 of any winning client bid and the analyst node 104 of the action plan transaction to alert them to the winning bid transaction(s). Further, the transmitting device 224 of the processing device 102 transmits a losing bid notification to the client node(s) 106 for any client bid in response to the action plan notice that was not a winning client bid. Alternatively, any losing bid notification(s) may not be transmitted until after an escrow payment transaction has been executed as in step 344 below. In step 334, the analyst node 104 associated with the analyst identification of the action plan transaction associated with the winning client bid(s) receives the winning bid notification(s), and in step 336, the client node(s) 106 of the winning client bid(s) receive(s) the winning bid notification(s).

In step 338, the client node 106 generates an escrow payment transaction (e.g., a new block), in a blockchain (e.g., the blockchain network 103) to facilitate payment of the bid amount contained in the winning client bid submitted by the client node 106. The escrow payment transaction includes account information for the client node 106 to be used for payment of the bid amount. For example, the escrow payment transaction may include, but is not limited to, the client identification, the plan identification of the winning client bid, a public key associated with the client node 106, a bid payment amount equal to the bid amount of the winning client bid, the payment source information and a client digital signature. The payment source information can be a blockchain address associated with the client node 106 (e.g., for use in a blockchain token transaction), or traditional bank account payment details (e.g., an account number and a routing number for a client account held at the issuing financial institution 110) and/or any suitable asset account used to transfer the value of the winning bid amount. In step 340, the client node 106 transmits the escrow payment transaction to the processing device 102. In an embodiment, if the processing device 102 does not receive the escrow payment transaction from the client node 106 by a pre-determined time after transmission of the winning bid notification to the client node 106 of the winning client bid, then the process can return to step 328 and a new winning client bid determined from the client bids submitted by client nodes other than client node 106. In an embodiment, the steps 338 and 340 are performed by the processing device 102 via a pull of the payment from an account associated with the client node 106 (e.g., an account listed in client profile data 216 associated with the client node 106). In the example where the escrow payment transaction is done via a pull of the payment initiated by the processing device 102, a smart contract may be used to execute and process the pull transaction. In an embodiment where multiple winning client bids are allowed, an escrow payment transaction as described above in steps 338-340 is executed for each winning client bid, and if the processing device 102 does not receive the escrow payment transaction for any winning client bid by a pre-determined time after transmission of the winning bid notification(s) to the client node(s) 106, then the process can return to step 328 and new winning client bids and associated bid positions determined from the submitted client bids, excluding any client bid for which an escrow payment transaction was not received by a pre-determined time after transmission of the winning bid notification(s) to the client node(s) 106.

In step 342, the receiving device 202 of the processing device 102 receives the escrow payment transaction(s) from the client node(s) 106 associated with the client identification(s) of the winning client bid(s). The processing device 102 executes the escrow payment transaction(s) at step 344 by transferring the escrow payment(s) from the client payment source(s) included in the escrow payment transaction(s) to an escrow account. The escrow account is an account controlled by an escrow node (e.g., the escrow node 108). In an embodiment, the validation module 222 of the processing device 102 may validate the client digital signature(s) of the escrow payment transaction(s). The processing device 102 may be configured to execute the escrow payment transaction(s) automatically at a predetermined time (e.g., a set period of time after the winning bid notification has been transmitted to the client node(s) 106 and the analyst node 104). Further, upon execution of the escrow payment transaction(s), the processing device 102 updates the escrow field in the row for the plan identification of the action plan transaction in the action plan data table 502 with the total amount transferred to the escrow account in step 344 for the winning client bid(s).

In step 346, the processing device 102 generates one or more escrow payment notices for the winning client bid(s). For example, the processing device 102 may generate a single escrow payment notice for the one or more winning client bids or the processing device 102 may generate an escrow payment notice for each winning client bid. The one or more escrow payment notices may include one or more data fields such as, but not limited to, the plan identification, the analyst identification of the analyst node 104 associated with the plan identification, the client identification associated with the client node 106 of the winning client bid, the bid amount and the public key of the client node 106. FIG. 4E illustrates an example escrow payment notice 458 generated for a winning client bid for the action plan transaction associated with the action plan transaction message 452. In an embodiment where multiple winning client bids are allowed, each of the one or more escrow payment notices includes an additional data field indicating the bid position of the winning client bid.

In step 348, the transmitting device 224 of the processing device 102 transmits the one or more escrow payment notices to the analyst node 104 associated with the analyst identification of the action plan transaction.

In step 352, the analyst node 104 receives the one or more escrow payment notices and in step 354 generates an encrypted action plan summary transaction message for each of the winning client bids. Each encrypted action plan summary transaction message includes one or more data fields such as, but not limited to, the analyst identification, the plan identification, the analyst digital signature, the client identification associated with the client node 106 of the winning client bid and plan information encrypted using the public key associated with the client node 106 of the winning client bid (e.g., the client public key included in the client bid and/or the escrow payment notice). The plan information may include, but is not limited to, a subject identification (e.g., the identification of the entity that is to be subjected to the action plan being recommended by the analyst node 104), the plan conviction value and a random number. In an embodiment, the plan information may also include a tilt (e.g., an indication of whether the action plan anticipates that the value of the asset represented by the subject identification will "Increase" or "Decrease") and/or a plan overview describing the recommended plan execution and the reasons the plan will achieve the desired outcome. FIG. 4F illustrates an example encrypted action plan summary transaction message 460. Further, in an embodiment where multiple winning client bids are allowed, the encrypted action plan summary transaction message includes an additional data field indicating the bid position of the winning client bid.

In step 356, the analyst node 104 transmits the encrypted action plan summary transaction message to the processing device 102, and in step 358, the receiving device 202 of the processing device 102 receives the encrypted action plan summary transaction message. The analyst node 104 may transmit the first encrypted action plan summary transaction message pertaining to the plan identification of the action plan transaction associated with the action plan transaction message 452 a pre-determined period of time after receiving the escrow payment notice (e.g., ten minutes, one hour, etc.). In an embodiment where multiple winning client bids are allowed, steps 356-358 are executed for each encrypted action plan summary transaction message associated with the one or more winning client bids in order based on bid position, with a pre-determined delay between each message (e.g., 1 day, 2 days, 1 week, etc.).

In step 360, the processing device 102 generates an encrypted action plan summary transaction (e.g., in a new block) in the blockchain (e.g., the blockchain network 103) including the one or more data fields of the encrypted action plan summary transaction message. In step 362, the transmitting device 224 of the processing device 102 transmits the encrypted action plan summary transaction to the blockchain network 103 including the client node 106 associated with the client identification of the winning client bid. In an embodiment where multiple winning client bids are allowed, steps 360-362 are executed for each encrypted action plan summary transaction message associated with the one or more winning client bids in order based on bid position, with a pre-determined delay between each message (e.g., 1 day, 2 days, 1 week, etc.).

In step 363, the processing device 102 generates an encrypted action plan summary notice to alert the client node 106 associated with the client identification of the winning client bid, the analyst node 104 and the other nodes of the blockchain network 103 of the encrypted action plan summary transaction, e.g., the new block of the blockchain.

In step 364, the transmitting device 224 of the processing device 102 transmits the encrypted action plan summary notice to the blockchain network 103. In an embodiment, the encrypted action plan summary notice is generated and transmitted using a smart contract. In step 365, a receiving device of the client node 106 receives the encrypted action plan summary notice.

In step 366, the client node 106 associated with the client identification of the winning client bid receives the encrypted action plan summary transaction. Since the plan information in the encrypted action plan summary transaction is encrypted using the public key of the client node 106, only the client node 106 is able to decrypt it using its private key. In step 367, the analyst node 104 receives the encrypted action plan summary transaction. In an embodiment where multiple winning client bids are allowed, steps 363-367 are executed for each encrypted action plan summary transaction associated with the one or more winning client bids in order based on bid position, with a pre-determined delay between each message (e.g., 1 day, 2 days, 1 week, etc.).

In step 368, the analyst node 104 generates an unencrypted action plan summary transaction message. The unencrypted action plan summary transaction message contains the same data fields and plan information as the encrypted action plan summary transaction message, except without the client identification field, and with the plan information unencrypted. In an embodiment where multiple winning client bids are allowed, step 368 is not executed until step 362 has been executed for all the encrypted action plan summary transactions for the winning client bids. In step 370, the analyst node transmits the unencrypted action plan summary transaction message to the processing device 102.

In step 372, the receiving device 202 of the processing device 102 receives from the analyst node 104 the unencrypted action plan summary transaction message. In an embodiment, the unencrypted action plan summary transaction message is received a pre-determined period of time after completion of step 362 for all encrypted action plan summary transactions for the winning client bids (e.g., one day, one week, two weeks, etc.).

In step 374, the processing device 102 encrypts the unencrypted plan information from the unencrypted action plan summary transaction message using the public key of client node 106. In step 376, (1) the processing device 102 compares this encryption of the unencrypted plan information from the unencrypted action plan summary transaction message with the encrypted plan information from the encrypted action plan summary transaction associated with the encrypted action plan summary transaction message 460 and (2) the validation module 222 of the processing device 102 (i) validates the subject identification in the plan information in the unencrypted action plan summary transaction message, (ii) checks that the value in the category identification column in the row in the subject table 506 for the subject identification in the plan information matches the category identification of the action plan transaction associated with the action plan transaction message 452 and (iii) checks that the analyst node 104 associated with the analyst identification in the unencrypted action plan summary transaction message is not associated with a plan identification having the same subject identification (e.g., each analyst node 104 can only submit a single action plan for a given subject identification at a time). If the encryptions match and the validations are successfully completed by the validation module 222, the process proceeds to step 378. If not, the process may end, the processing device 102 may send a notice to both the analyst node 104 and the client node 106, the processing device 102 may return to the client node 106 the escrow payment transferred in step 344 and/or the processing device 102 may update a field in the analyst profile data 212 associated with the analyst node 104 that counts the invalid unencrypted action plan summary transaction messages submitted by the analyst node. In an embodiment, the validation of the subject identification and that the value in the category identification column in the row in the subject table 506 for the subject identification in the plan information matches the category identification of the action plan transaction associated with the action plan transaction message 452, the checking for other analyst node 104 action plan submissions for that subject identification and the comparison of the encryption of the unencrypted plan information from the unencrypted action plan summary transaction message with the encrypted plan information from the encrypted action plan summary transaction associated with the encrypted action plan summary transaction message 460 are performed by a second smart contract. In an embodiment where multiple winning client bids are allowed, steps 374-376 are executed for each encrypted action plan summary transaction associated with the one or more winning client bids.

In step 378, the processing device 102 transfers a partial percentage of the bid payment amount of the escrow payment transaction from the escrow account of the escrow node 108 to an account associated with the analyst node 104. The account associated with the analyst node 104 may be defined in the analyst profile data 212 associated with the analyst node 104. For example, the bid payment amount of the escrow payment transaction may be USD 270, and the processing device 102 may transfer fifty percent (i.e., USD 135) of the bid payment amount to the analyst account associated with the analyst node 104. In an embodiment, the processing device 102 updates the "paid" field in the row for the plan identification of the unencrypted action plan summary transaction message in the action plan data table 502 to indicate the analyst node 104 has been paid the percentage of the bid payment amount. In an embodiment where multiple winning client bids are allowed, step 378 is executed for each of the one or more escrow payment transactions associated with the winning client bid(s).

In step 380, the processing device 102 generates an unencrypted action plan summary transaction (e.g., a new block), in the blockchain (e.g., the blockchain network 103), including the one or more data fields of the unencrypted action plan summary transaction message. The unencrypted action plan summary transaction contains the plan information from the encrypted action plan summary transaction with no encryption, which enables all nodes in the blockchain network 103 to view the plan information that was verifiably received by the client node(s) 106 in step 366. Further, the processing device 102 calculates a start time for the plan identification. For example, but not limited to, the start time is the date and time the first encrypted action plan summary transaction for the plan identification is transmitted by the processing device 102. The processing device 102 also calculates a start value by submitting the start time and the subject identification in the plan information of the unencrypted action plan summary transaction generated in step 380 to the start value function defined in the start value function column in the row of the category table 504 for the category identification of the action plan transaction associated with the action plan transaction message 452. For example, but not limited to, the start value is the volume-weighted average price (VWAP) over a period of time of the asset represented by the subject identification in the plan information of the unencrypted action plan summary transaction. The VWAP may be calculated for a pre-defined time period following the start time (e.g., between 2:00 pm and 4:00 pm EST for a 1:59 pm EST start time) to approximate the price at which the client node 106 would be able to execute the action plan in an orderly fashion without disrupting the asset price. The processing device 102 updates the action plan data table 502 with the start time, the start value, the subject identification and any tilt value from the plan information of the unencrypted action plan summary transaction. Step 380 is only executed once for each plan identification, regardless of the number of winning client bids.

In step 382, the transmitting device 224 of the processing device 102 transmits the unencrypted action plan summary transaction to the blockchain network 103. In steps 384 and 385, the analyst node 104 and the client node(s) 106 receive the unencrypted action plan summary transaction, respectively, as nodes in the blockchain network 103.

In step 386, the analyst node 104 generates an encrypted action plan update transaction message for each of the winning client bids. Each encrypted action plan update transaction message includes one or more data fields such as, but not limited to, the analyst identification, the client identification, the update time, the plan identification, the analyst digital signature and plan update information encrypted using the public key of the client node 106 of the winning client bid. The plan update information includes, but is not limited to, a plan status (e.g., "open" if the analyst continues to recommend execution of the action plan or "closed" if the analyst no longer recommends execution of the action plan) and a random number. FIG. 4G illustrates an example encrypted action plan update transaction message 462. Further, in an embodiment where multiple winning client bids are allowed, the encrypted action plan update transaction message includes an additional data field indicating the bid position of the winning client bid. Also, in an embodiment where multiple winning client bids are allowed, step 386 is not executed until step 362 has been executed for all the encrypted action plan summary transactions for the winning client bids.

In step 388, the analyst node 104 transmits the encrypted action plan update transaction message 462 to the processing device 102 and in step 390, the receiving device 202 of the processing device 102 receives the encrypted action plan update transaction message. The analyst node 104 may transmit the first encrypted action plan update transaction message 462 pertaining to the plan identification of the action plan transaction associated with the action plan transaction message 452 at a pre-determined time after the action plan transaction was transmitted (e.g., one day or one week) and subsequent encrypted action plan update transaction messages at regular intervals thereafter (e.g., every day until the action plan is closed). In an embodiment where multiple winning client bids are allowed, steps 388-390 are executed for each encrypted action plan update transaction message associated with the one or more winning client bids in order based on bid position, with a pre-determined delay between each message (e.g., 1 day, 2 days, 1 week, etc.).

In step 392, the processing device 102 generates an encrypted action plan update transaction (e.g., a new block), in the blockchain (e.g., the blockchain network 103) including the one or more data fields of the encrypted action plan update transaction message 462 and an additional data field containing a newly generated update identification, and sets the update time field to the current time. In step 394, the transmitting device 224 of the processing device 102 transmits the encrypted action plan update transaction to the blockchain network 103, including the client node 106 associated with the client identification of the winning client bid. In steps 396 and 398, the client node 106 and the analyst node 104 each receive the encrypted action plan update transaction, respectively, as nodes in the blockchain network 103. In an embodiment where multiple winning client bids are allowed, steps 392-398 are executed for each encrypted action plan update transaction message associated with the one or more winning client bids in order based on bid position, with the update identification and update time fields set to the values generated in step 392 for the encrypted action plan update transaction associated with the winning client bid assigned the first bid position and with a pre-determined delay between each message (e.g., 1 day, 2 days, 1 week, etc.).

In step 400, the processing device 102 generates an encrypted action plan update notice. The encrypted action plan update notice includes all the data fields of the encrypted action plan update transaction. In step 402, the transmitting device 224 of the processing device 102 transmits the encrypted action plan update notice to the client node 106 associated with the winning client bid and the analyst node 104. The plan update information of the encrypted action plan update notice is encrypted using the public key of the client node 106 and thus only the client node 106 is able to decrypt it. In steps 403 and 404, the client node 106 and the analyst node 104 each receive the encrypted action plan update notice, respectively. The encrypted action plan update notice is sent to alert the client node 106 of the existence of the encrypted action plan update transaction in the blockchain 103 so the client node 106 knows to look for the update transaction. Otherwise, it would be up to the client associated with the client node 106 to actively monitor the blockchain for any updates regarding any action plan transaction messages for which they submitted a winning client bid. In an embodiment where multiple winning client bids are allowed, steps 400-404 are executed for each encrypted action plan update transaction associated with the one or more winning client bids in order based on bid position, with a pre-determined delay between each message (e.g., 1 day, 2 days, 1 week, etc.).

In step 406, the analyst node 104 generates an unencrypted action plan update transaction message. The unencrypted action plan update transaction message contains the same data fields and plan update information as the encrypted action plan update transaction message 462, but with an additional data field with the update identification from the encrypted action plan update transaction(s) generated in step 392 and with the plan update information unencrypted. In an embodiment where multiple winning client bids are allowed, step 406 is not executed until step 394 has been executed for all the encrypted action plan update transactions for a given update identification for the winning client bid(s). In step 408, the analyst node transmits the unencrypted action plan update transaction message to the processing device 102.

In step 410, the receiving device 202 of the processing device 102 receives from the analyst node 104 the unencrypted action plan update transaction message. In an embodiment, the unencrypted action plan update transaction message is received a pre-determined period of time after the first encrypted action plan update transaction for a given update identification was transmitted to the blockchain network 103, e.g., one day, one week, two weeks, etc.

In step 412, the processing device 102 encrypts the unencrypted plan update information from the unencrypted action plan update transaction message using the public key of the client node 106 and then in step 414, compares this encryption of the unencrypted plan update information from the unencrypted action plan update transaction message with the encrypted plan update information from the encrypted action plan update transaction associated with the same update identification. If the encryptions match at step 416, the process proceeds to step 418. If the encryptions do not match at step 416, the process may end, the processing device 102 may send a notice to the analyst node 104 and the client node 106, the processing device 102 may return to the client node 106 the remaining percentage of the bid payment amount of the escrow payment transaction from the escrow account of the escrow node 108 and/or the processing device 102 may update a field in the analyst profile data 212 associated with the analyst node 104 that counts the invalid unencrypted action plan update transaction messages submitted by the analyst node. In an embodiment, the comparison of the encryption of the unencrypted plan update information from the unencrypted action plan update transaction message with the encrypted plan update information from the encrypted action plan update transaction associated with the same update identification is performed by a smart contract. In an embodiment where multiple winning client bids are allowed, steps 412-414 are executed for each encrypted action plan update transaction for a given update identification associated with the one or more winning client bids.

In step 418, the processing device 102 determines that either the plan status in the unencrypted plan update information is equal to "closed" (e.g., the analyst node 104 associated with the analyst identification of the action plan transaction associated with the action plan transaction message 452 no longer recommends execution of the action plan referenced by the action plan transaction) or that the maximum execution time permitted for action plans with the category identification of the action plan transaction associated with the action plan transaction message 452 has elapsed. The processing device 102 calculates an end time for the plan identification (e.g., the date and time the action plan is closed). For example, but not limited to, the end time is the update time field in the encrypted action plan update transaction with the same update identification as the unencrypted action plan update transaction message. The processing device 102 also calculates an end value by submitting the end time and the subject identification in the plan information of the unencrypted action plan summary transaction transmitted by the processing device 102 in step 382 to the end value function defined in the end value function column in the row of the category table 504 for the category identification of the action plan transaction associated with the action plan transaction message 452. For example, but not limited to, the end value is the price at the end time of the asset represented by the subject identification in the plan information of the unencrypted action plan summary transaction. Further, the processing device 102 calculates a plan return value by submitting the start time, the start value, the end time, the end value, the subject identification in the plan information of the unencrypted action plan summary transaction transmitted by the processing device 102 in step 382 and the tilt value (if applicable) to the plan return function defined in the plan return function column in the row of the category table 504 for the category identification of the action plan transaction associated with the action plan transaction message 452. For example, but not limited to, the plan return value is the result of calculating an annualized return, based on the start and end times, from the difference between (1) the percentage change between the start value and the end value and (2) the percentage change between the start and end times of the benchmark for the asset represented by the subject identification in the plan information of the unencrypted action plan summary transaction. The processing device 102 updates the action plan data table 502 with the end time, the end value and the plan return value. In an embodiment, the smart contract may be executed to calculate the end time, the end value and the plan return value and update the action plan data table 502.

In step 420, the processing device 102 transfers the remaining percentage of the bid payment amount of the escrow payment transaction from the escrow account of the escrow node 108 to the account associated with the analyst node 104. The processing device 102 updates the "paid" field of the action plan data table 502 to indicate the analyst node 104 has been paid the remaining percentage of the bid payment amount of the escrow payment transaction. In an embodiment, the processing device 102 may calculate a platform fee for the plan identification and deduct the platform fee from the remaining percentage of the bid payment amount. In an embodiment where multiple winning client bids are allowed, step 420 is executed for each of the one or more winning client bids.

In step 422, the processing device 102 updates the analyst category track record value (e.g., track record for action plans with the category identification of the action plan transaction associated with the action plan transaction message 452) for the analyst node 104 based on the plan return value calculated in step 418. For example, the processing device may update the analyst profile data 212 of the analyst profile database 210 associated with the analyst node 104 with the updated category track record value.

In step 424, the processing device 102 generates an unencrypted action plan update transaction (e.g., a new block), in the blockchain (e.g., the blockchain network 103) including the one or more data fields of the unencrypted action plan update transaction message. In step 426, the transmitting device 224 of the processing device 102 transmits the unencrypted action plan update transaction to the blockchain network 103. In steps 428 and 430, the client node(s) 106 and the analyst node 104 each receive the unencrypted action plan update transaction, respectively, as nodes in the blockchain network 103. In an exemplary embodiment, the steps 424-430 proceed regardless of the determination in step 418 of the plan status in the plan update information of the unencrypted action plan update transaction message.

Exemplary Method for Subscribing to Action Plans

Figure 6:
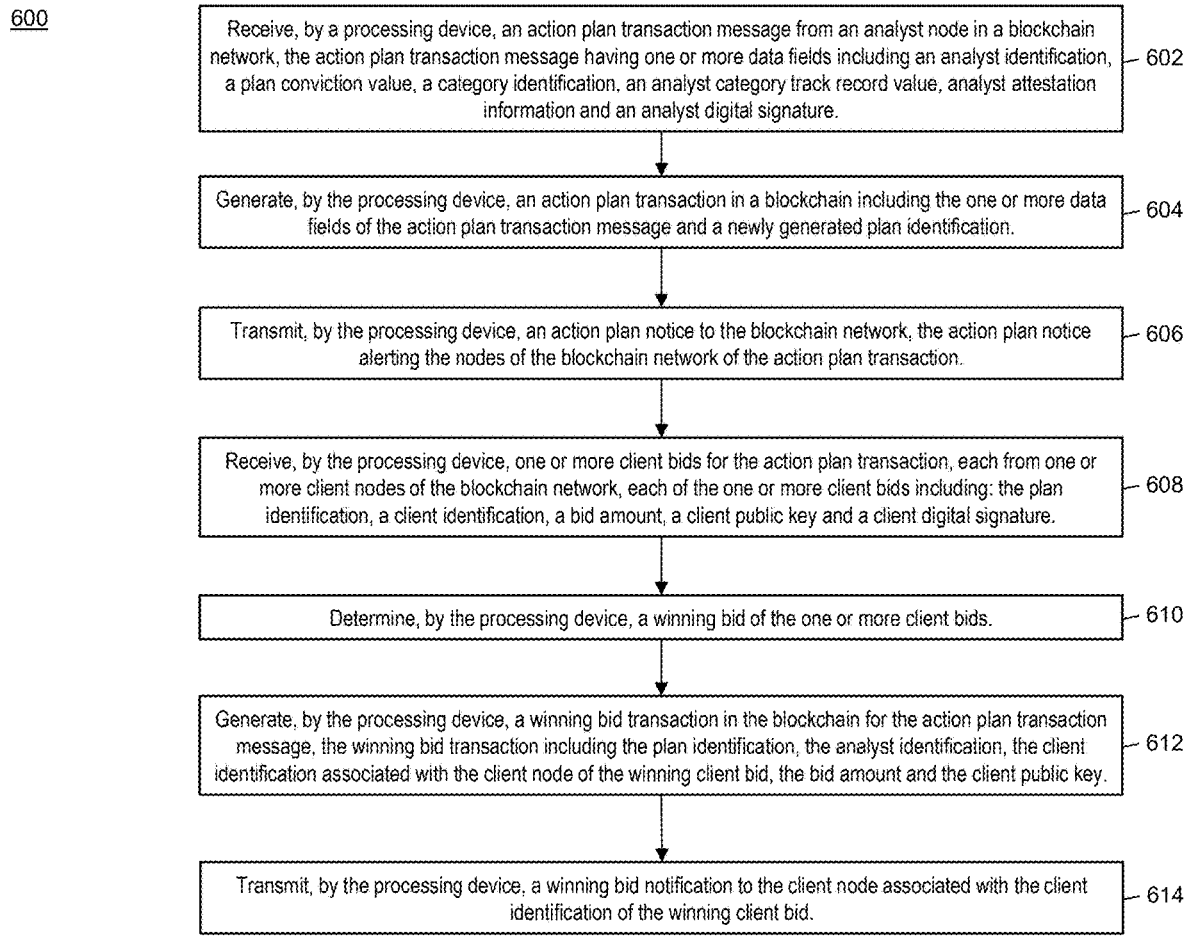
FIG. 6 is a flowchart exhibiting a method for subscribing to action plans in accordance with exemplary embodiments.

FIG. 6 displays a method 600 for subscribing to action plans in accordance with exemplary embodiments.

The method 600 can include block 602 of receiving, by a processing device, e.g., the processing device 102, an action plan transaction message from an analyst node, e.g., the analyst node 104, in a blockchain network, e.g., the blockchain network 103, the action plan transaction message having one or more data fields including an analyst identification, a plan conviction value, a category identification, an analyst category track record value, analyst attestation information and an analyst digital signature.

The method 600 can include block 604 of generating, by the processing device (e.g., the processing device 102), an action plan transaction in a blockchain including the one or more data fields of the action plan transaction message and a newly generated plan identification.

The method 600 can include block 606 of transmitting, by the processing device (e.g., the processing device 102), an action plan notice (e.g., the action plan notice 454) to the blockchain network (e.g., the blockchain network 103). The action plan notice (e.g., the action plan notice 454) alerts the nodes of the blockchain network of the action plan transaction.

The method 600 can include block 608 of receiving, by the processing device (e.g., the processing device 102), one or more client bids for the action plan transaction. The one or more client bids may each be received from one or more client nodes (e.g., the client nodes 106), of the blockchain network (e.g., the blockchain network 103). Each of the one or more client bids includes at least the plan identification, a client identification, a bid amount, a client public key and a client digital signature.

The method 600 can include block 610 of determining, by the processing device, (e.g., the processing device 102), a winning client bid of the one or more client bids.

The method 600 can include block 612 of generating, by the processing device, (e.g., the processing device 102), a winning bid transaction in the blockchain (e.g., the blockchain network 103) for the action plan transaction (e.g., the action plan transaction associated with the action plan transaction message 452). The winning bid transaction includes at least the plan identification, the analyst identification, the client identification associated with the client node of the winning client bid, the bid amount and the client public key.

The method 600 can include block 614 of transmitting, by the processing device, (e.g., the processing device 102), a winning bid notification to the client node (e.g., the client node 106) associated with the client identification of the winning client bid.

Computer System Architecture

Figure 7:
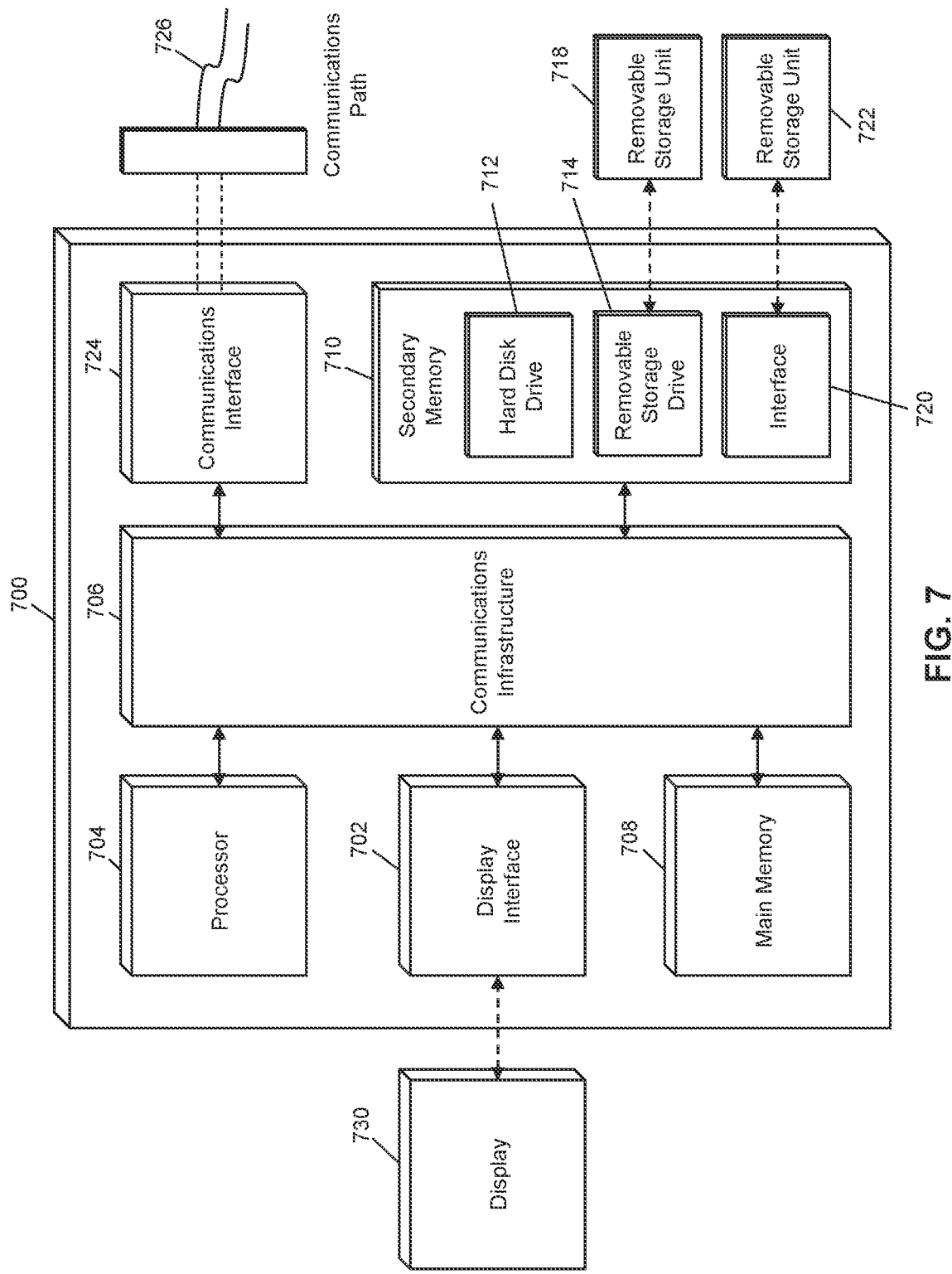
FIG. 7 is a block diagram displaying the architecture of a computer system in accordance with exemplary embodiments.

FIG. 7 displays a computer system 700 which can be deployed via computer-readable code to effect the present disclosure, either in whole, in part or in embodiments. For example, the blockchain node 102, the analyst node 104, the client node 106, the escrow node 108, the issuing financial institution 110 and/or the escrow financial institution 112 of FIG. 1 can be deployed in one or more computer systems such as the computer system 700 utilizing any permutation of components that store instructions including physical equipment such as hardware and non-transitory computer readable media and/or intangible elements such as software and firmware, with any such components—either individually or in concert with one or more others—capable of encapsulating modules that execute the functions and methods of FIGS. 3A-3G and 6.

Reconfigurable digital circuits can be programmed to exploit standard processing platforms to operate as computing units that carry out specific tasks (e.g., application-specific integrated circuit, combinational logic circuit, etc.). While a configuration as simple as a processing device and memory may suffice to execute the present disclosure and associated embodiments, any computer system arrangement such as a grid computer, a computing cluster, an integrated circuit with multiple central processing units (CPUs), a mainframe, a midrange computer or an embedded computing platform can also be utilized, as evident to those with competency in the pertinent art.

The discussion herein of a processor unit or device may refer to one processor, multiple processors or other permutations of processor configurations, each possessing at least one processor "core." In addition, a hard disk residing in hard disk drive 712 and removable storage units 718 and 722 are exemplar tangible media that expressions such as "computer usable medium, "computer program medium" and "non-transitory computer readable medium" may reference herein.

Although the computer system 700 is used to illustrate the present disclosure and embodiments, other computer systems and/or configurations can also be utilized, as evident to those with proficiency in the pertinent art upon reviewing this disclosure. While the description includes sequential operations, some steps could be performed simultaneously and/or by distributed machines with any number of processors executing code saved locally or retrieved from another location. In some embodiments, certain steps could be undertaken in a different order than set forth while maintaining the essence of the present disclosure.

Processor device 704 can be specially designed or general purpose and tailored to execute the operations expounded herein, and may be linked to a communications infrastructure 706, which can be an interconnect, an asynchronous message queue, a synchronous message passing platform, a communications network, etc. Any type of network capable of executing the operations expounded herein such as a wired network (e.g., wide area or local area Ethernet), a wireless electromagnetic signal network (e.g., cellular, Bluetooth, Wi-Fi, near-field communication), a physical cable network, a composite of network types or any other fitting system evident to those with proficiency in the pertinent art is plausible. The computer system 700 can have a main memory 708 (e.g., static random access memory (SRAM), dynamic random access memory (DRAM), programmable read-only memory (PROM), electrically erasable programmable read-only memory (EEPROM), etc.) and a secondary memory 710 such as the removable storage drive 714 or the hard disk drive 712 which can include a universal serial bus port, external hard disk drive, memory card slot, compact disc drive, etc.

Data can be recorded to or received from the removable storage unit 718, which may comprise a removable storage media such as a solid-state flash drive or compact disc, by a removable storage drive 714 compatible with the underlying media using widely acknowledged procedures. Non-transitory computer readable recording media can, in one embodiment, comprise the removable storage unit 718.

In some embodiments, the computer system 700 may accept executables or other computing commands from the secondary memory 710 via for example the removable storage unit 722 utilizing interface 720. Exemplary arrangements can include removable non-volatile memory units (e.g., EEPROM, PROM, etc.), ROM cartridges (e.g., as employed by gaming consoles) paired with compatible interfaces and other combinations of the removable storage unit 722 and interface 720 as evident to those with proficiency in the pertinent art.

Any media that a computer can read such as solid state storage (e.g., universal serial bus flash drives, flash memory cards, etc.), optical storage (e.g., a compact disc, Blu-ray disc, etc.) or magnetic storage (e.g., a hard disk, tape drive, etc.) can be utilized to save data by components of the computer system 700 such as the main memory 708 and/or the secondary memory 710. The data can be structured into any usable database type such as a relational database, object-oriented database, network database, NoSQL database, etc. Appropriate storage media and data arrangements will be evident to those with proficiency in the pertinent art.

The computer system 700 can have a communications interface 724 such as a network interface controller (e.g., a LAN adapter), a communications port, a PCMCIA slot and card, etc. that may be programmed to transmit software and data among the computer system 700 and external devices. The transmissions of communications interface 724 can be signals in electromagnetic, optical, electronic or other forms, as evident to those with proficiency in the pertinent art. The signal transmissions can be propagated via a communications path 726 that utilizes conduits such as coaxial cable, fiber optics, twisted copper, electromagnetic spectrum, etc.

The computer system 700 can have a display interface 702 such as a universal serial bus (USB), high-definition multimedia interface (HDMI), digital visual interface (DVI), etc. that is programmed to convey data from the computer system 700 to external display 730 which can employ light-emitting diodes (LED), liquid crystals (LCD), plasma, etc.

The computer system 700 can execute computer programs such as computer control logic, for example with the computer program acting as a controller of computer system 700 via its command of the processor device 704, to effect the present processes and methods as expounded herein and shown in FIGS. 3A-3G and 6. Computer programs can be made available to the computer system 700 through storage in main memory 708 and/or secondary memory 710, transmission via the communications interface 724 or, where software is utilized, storage on a computer program product (e.g., computer program media and/or computer usable media that can comprise memory composed of semiconductor materials such as SRAM or DRAM) and deployment to computer system 700 via the removable storage drive 714, interface 720, hard disk drive 712 or communications interface 724.

The processor device 704 can consist of one or more modules or engines that are programmed to execute the functions of the computer system 700 utilizing hardware and, potentially, software including programs saved in the main memory 708 or secondary memory 710 and/or program code composed in a programming language (e.g., source code) which is converted by the processor device 704 (e.g., utilizing a compiling module) into a lower level language (e.g., machine code or assembly language) that can be executed by the processor device 704 or other hardware of the computer system 700. Compiling can comprise preprocessing, tokenization, parsing, context sensitive analysis and type checking, code generation and/or other appropriate processes for transforming program code into a form capable of controlling the computer system 700 such that, as evident to those with proficiency in the pertinent art, it is customized to execute the functions expounded herein.

Techniques adhering to the present disclosure deliver, among other elements, systems and methods for subscribing to action plans. Though a host of exemplary embodiments of the disclosed system and method have been presented in the foregoing description, they are aimed at being illustrative and by no means limiting. The list of embodiments is not absolute and does not confine the disclosure to the exact form put forward. Edits or changes derived from the above teachings or practice of the disclosure are possible without detracting from the range or scope. While the description includes sequential operations, some steps could be performed simultaneously and/or by distributed machines with any number of processors executing code saved locally or retrieved from another location. In some embodiments, certain steps could be undertaken in a different order than described while maintaining the essence of the present disclosure. As evident to those with proficiency in the pertinent art, the present disclosure can be manifested in additional constructs while maintaining the essence and fundamental elements, and the discussed embodiments are meant to be instructive, but by no means limiting. The appended claims communicate the scope of the disclosure, not the preceding description, and all modifications that fall inside the meaning, breadth and equivalence thereof are meant to be encompassed therein.

What is claimed is:

1. A method for subscribing to action plans, the method comprising:
    receiving, by a processing device, from an analyst node in a blockchain network, an encrypted action plan summary transaction message including one or more data fields and a first analyst digital signature, the one or more data fields including an analyst identification, a client identification of a client node in the blockchain network, a plan identification, a category identification and plan information, the plan information encrypted using a client encryption key of a client cryptographic key pair corresponding to the client node, the plan information including a subject identification, a tilt value and a random number;
    generating, by the processing device, an encrypted action plan summary transaction including the content of the encrypted action plan summary transaction message;
    transmitting, by the processing device, the encrypted action plan summary transaction to the blockchain network, the blockchain network having a plurality of nodes including the client node and the analyst node;
    receiving, by the processing device, a set period of time after transmission of the encrypted action plan summary transaction to the blockchain network, from the analyst node associated with the analyst identification of the encrypted action plan summary transaction or the client node associated with the client identification of the encrypted action plan summary transaction, an unencrypted action plan summary transaction message including one or more data fields and a digital signature associated with the node from which the unencrypted action plan summary transaction message is received, the one or more data fields and the one or more values in the data fields being the same as those in the encrypted action plan summary transaction message, except without the client identification and category identification fields, and with the plan information unencrypted; and
    in response to receiving the unencrypted action plan summary transaction message the set period of time after transmission of the encrypted action plan summary transaction to the blockchain network:
        encrypting, by the processing device, using the client encryption key of the client cryptographic key pair, the unencrypted plan information from the unencrypted action plan summary transaction message;
        comparing, by the processing device, the encryption of the unencrypted plan information from the unencrypted action plan summary transaction message with the encrypted plan information from the encrypted action plan summary transaction;
        in response to determining that the encryption of the unencrypted plan information from the unencrypted action plan summary transaction message matches the encrypted plan information from the encrypted action plan summary transaction, generating, by the processing device, an unencrypted action plan summary transaction in the blockchain including the content of the unencrypted action plan summary transaction message; and
        transmitting, by the processing device, the unencrypted action plan summary transaction to the blockchain network.

2. The method of claim 1, wherein the receiving the encrypted action plan summary transaction message includes:
    receiving, by the processing device, an action plan transaction message from the analyst node in the blockchain network, the action plan transaction message including one or more data fields and a second analyst digital signature, the one or more data fields including the analyst identification, a plan conviction value, and the category identification;
    generating, by the processing device, an action plan transaction in the blockchain including the content of the action plan transaction message and the plan identification;
    receiving, by the processing device, one or more bids for the action plan transaction, each from one or more client nodes of the blockchain network, each of the one or more bids including one or more data fields and a digital signature associated with the node from which the bid is received, the one or more data fields including: the plan identification, a client identification, and a bid amount;
    determining, by the processing device, the winning bid of the one or more bids; and
    generating, by the processing device, a winning bid transaction in the blockchain for the action plan transaction, the winning bid transaction including the plan identification, the analyst identification, the client identification associated with the client node of the winning bid, and the bid amount of the winning bid.

3. The method of claim 2, comprising:
   receiving, by the processing device, a request for action plans message (RFP), the action plan transaction message including an RFP identification field, wherein the action plan transaction message is received in response to receipt of the RFP and the action plan transaction message includes the RFP identification; and
   transmitting, by the processing device, the request for action plans message (RFP) to the blockchain network.

4. The method of claim 2, wherein the winning bid transaction is generated and transmitted via execution of a smart contract.

5. The method of claim 2, the determining, by the processing device, the winning bid comprises:
   determining, by the processing device, more than one bid is a winning bid;
   assigning, by the processing device, a bid position to each node having a winning bid;
   wherein the generating, by the processing device, the winning bid transaction in the blockchain for the action plan transaction includes generating, by the processing device, a winning bid transaction for each node identification associated with each node having a winning bid, each winning bid transaction further including the bid position assigned to the node; and
   transmitting, by the processing device, a winning bid notification to each of the nodes associated with the identifications of the winning bids.

6. The method of claim 1, wherein the receiving the encrypted action plan summary transaction message includes:
   receiving, by the processing device, a payment transaction from the client node associated with the client identification of the encrypted action plan summary transaction, the payment transaction including one or more data fields and a client digital signature, the one or more data fields including the client identification, the plan identification, a payment amount and a client account identification;
   transferring, by the processing device, the payment amount from a client account associated with the client account identification to a payment account, the payment account being a node of the blockchain; and
   transmitting, by the processing device, a payment notice to the analyst node.

7. The method of claim 6, wherein the transferring the payment from the client account to the payment account is done via a push or pull transaction executed by a smart contract.

8. The method of claim 6, wherein the payment transaction is an escrow payment transaction and wherein the payment account is an escrow account.

9. The method of claim 1, wherein in response to determining that the encryption of the unencrypted plan information from the unencrypted action plan summary transaction message matches the encrypted plan information from the encrypted action plan summary transaction, the method further comprising:
   transferring, by the processing device, a partial percentage of the payment amount of the payment transaction from the payment account to an account associated with the analyst node.

10. The method of claim 1, comprising:
    receiving, by the processing device, from the analyst node associated with the analyst identification of the encrypted action plan summary transaction, an encrypted action plan update transaction message including one or more data fields and a third analyst digital signature, the one or more data fields including the analyst identification, the client identification, an update time, the plan identification and plan update information encrypted using the client encryption key of the client cryptographic key pair, the plan update information including a plan status and a random number;
    generating, by the processing device, an encrypted action plan update transaction in the blockchain including the content of the encrypted action plan update transaction message and a newly generated update identification; and
    transmitting, by the processing device, the encrypted action plan update transaction to the blockchain network including the client node associated with the client identification of the encrypted action plan summary transaction.

11. The method of claim 10, comprising:
    receiving, by the processing device, a set period of time after transmission of the encrypted action plan update transaction, from the analyst node associated with the analyst identification of the encrypted action plan summary transaction or the client node associated with the client identification of the encrypted action plan summary transaction, an unencrypted action plan update transaction message including one or more data fields and a fourth digital signature associated with the node from which the unencrypted action plan update transaction message is received, the one or more data fields and the one or more values in the data fields being the same as those in the encrypted action plan update transaction message, except without the client identification field, with an additional data field with the update identification from the encrypted action plan update transaction and with the plan update information unencrypted;
    encrypting, by the processing device, with the client encryption key of the client cryptographic key pair, the unencrypted plan update information;
    comparing, by the processing device, the encryption of the unencrypted plan update information with the encrypted plan update information from the encrypted action plan update transaction;
    in response to determining that the encryption of the unencrypted plan update information matches the encrypted plan update information from the encrypted action plan update transaction, determining, by the processing device, that the plan status in the unencrypted plan update information is "closed" or that the maximum execution time permitted for action plans with the category identification of the encrypted action plan summary transaction has elapsed;
    generating, by the processing device, an unencrypted action plan update transaction in the blockchain including the content of the unencrypted action plan update transaction message; and
    transmitting, by the processing device, the unencrypted action plan update transaction to the blockchain network.

12. The method of claim 11, wherein in response to determining that the encryption of the unencrypted plan update information matches the encrypted plan update information from the encrypted action plan update transaction, the method further comprises:
    transferring, by the processing device, the remaining percentage of the payment amount of the payment transaction from the payment account to the account associated with the analyst node.

13. The method of claim 11, comprising:
calculating, by the processing device, a start value based on the subject identification and the start time, the start time being the date and time the encrypted action plan summary transaction is transmitted;
calculating, by the processing device, an end value based on the subject identification and the end time, the end time being the time in the update time field of the encrypted action plan update transaction with the same update identification as the unencrypted action plan update transaction message whose processing reveals either a plan status of "closed" in the plan update information or that the maximum plan execution time permitted for the category identification has elapsed; and
calculating, by the processing device, a plan return value for the plan identification based on the start time, the start value, the end time, the end value, the subject identification and the tilt value.

14. The method of claim 13, wherein the start time, start value, the end time, the end value and the plan return value are each calculated via execution of a smart contract.

15. The method of claim 13, comprising:
storing, by the processing device, an action plan data table, the action plan data table storing one or more action plans submitted by one or more analyst nodes in the blockchain network;
updating, by the processing device, the action plan data table with the one or more data fields of the encrypted action plan summary transaction;
updating, by the processing device, the action plan data table with the one or more data fields of the unencrypted action plan summary transaction;
updating, by the processing device, the action plan data table with the start time, the start value, the subject identification and the tilt value; and
updating, by the processing device, the action plan data table with the end time, the end value and the plan return value.

16. The method of claim 15, comprising:
updating, by the processing device, the action plan data table with the payment transaction;
updating, by the processing device, the action plan data table with the partial percentage of the payment amount of the payment transaction transferred to the account associated with the analyst node; and
updating, by the processing device, the action plan data table with the remaining percentage of the payment amount of the payment transaction transferred from the payment account to the account associated with the analyst node.

17. The method of claim 15, comprising:
updating, by the processing device, the action plan data table with the one or more client bids.

18. The method of claim 13, comprising:
updating, by the processing device, the analyst category track record value based on the closed action plan and the plan return value.

19. The method of claim 1, wherein the unencrypted action plan summary transaction message includes the client encryption key of the client cryptographic key pair.

20. A system for subscribing to action plans, the system comprising:
one or more processors, one or more computer-readable memories, one or more computer-readable tangible storage devices, and instructions stored on at least one of the one or more storage devices for execution by at least one of the one or more processors via at least one of the one or more memories, the instructions comprising:
instructions to receive from an analyst node in a blockchain network, an encrypted action plan summary transaction message including one or more data fields and an analyst digital signature, the one or more data fields including an analyst identification, a client identification of a client node, a plan identification, a category identification and plan information, the plan information encrypted using a client encryption key of a client cryptographic key pair corresponding to the client node, the plan information including a subject identification, a tilt value and a random number;
instructions to generate an encrypted action plan summary transaction including the content of the encrypted action plan summary transaction message;
instructions to transmit the encrypted action plan summary transaction to the blockchain network, the blockchain network having a plurality of nodes including the client node and the analyst node;
instructions to receive, a set period of time after transmission of the encrypted action plan summary transaction to the blockchain network, from the analyst node associated with the analyst identification of the encrypted action plan summary transaction or the client node associated with the client identification of the encrypted action plan summary transaction, an unencrypted action plan summary transaction message including one or more data fields and a digital signature associated with the node from which the unencrypted action plan summary transaction message is received, the one or more data fields and the one or more values in the data fields being the same as those in the encrypted action plan summary transaction message, except without the client identification and category identification fields, and with the plan information unencrypted; and
in response to the instructions to receive the unencrypted action plan summary transaction message the set period of time after transmission of the encrypted action plan summary transaction to the blockchain network:
instructions to encrypt, using the client encryption key of the client cryptographic key pair, the unencrypted plan information from the unencrypted action plan summary transaction message;
instructions to compare the encryption of the unencrypted plan information from the unencrypted action plan summary transaction message with the encrypted plan information from the encrypted action plan summary transaction;
in response to determining that the encryption of the unencrypted plan information from the unencrypted action plan summary transaction message matches the encrypted plan information from the encrypted action plan summary transaction, instructions to generate an unencrypted action plan summary transaction in the blockchain including the content of the unencrypted action plan summary transaction message; and
instructions to transmit the unencrypted action plan summary transaction to the blockchain network.

21. The system of claim 20, wherein the receiving the encrypted action plan summary transaction message includes:
- instructions to receive an action plan transaction message from the analyst node in the blockchain network, the action plan transaction message including one or more data fields and a second analyst digital signature, the one or more data fields including the analyst identification, a plan conviction value, and the category identification;
- instructions to generate an action plan transaction in the blockchain including the content of the action plan transaction message and the plan identification;
- instructions to receive one or more bids for the action plan transaction, each from one or more client nodes of the blockchain network, each of the one or more bids including one or more data fields and a digital signature associated with the node from which the bid is received, the one or more data fields including: the plan identification, a client identification, and a bid amount;
- instructions to determine the winning bid of the one or more bids; and
- instructions to generate a winning bid transaction in the blockchain for the action plan transaction, the winning bid transaction including the plan identification, the analyst identification, the client identification associated with the client node of the winning bid, and the bid amount of the winning bid.

22. The system of claim 20, wherein the receiving the encrypted action plan summary transaction message includes:
- instructions to receive a payment transaction from the client node associated with the client identification of the encrypted action plan summary transaction, the payment transaction including one or more data fields and a client digital signature, the one or more data fields including the client identification, the plan identification, a payment amount and a client account identification;
- instructions to transfer the payment amount from a client account associated with the client account identification to a payment account, the payment account being a node of the blockchain; and
- instructions to transmit a payment notice to the analyst node.

23. A method for subscribing to action plans, the method comprising:
- receiving, by a processing device, an action plan transaction message from an analyst node in a blockchain network, the action plan transaction message including one or more data fields and a first analyst digital signature, the one or more data fields including an analyst identification, a plan conviction value, and a category identification;
- generating, by the processing device, an action plan transaction in the blockchain including the content of the action plan transaction message and a plan identification;
- receiving, by the processing device, one or more bids for the action plan transaction, each from one or more nodes of the blockchain network, each of the one or more bids including one or more data fields and a digital signature associated with the node from which the bid is received, the one or more data fields including: the plan identification, a node identification, and a bid amount;
- determining, by the processing device, a winning bid for the action plan transaction;
- generating, by the processing device, a winning bid transaction in the blockchain for the action plan transaction, the winning bid transaction including the plan identification, the analyst identification, the identification associated with the node of the winning bid, and the bid amount of the winning bid;
- transmitting, by the processing device, a winning bid notification to the node associated with the identification of the winning bid;
- receiving, by the processing device, from the analyst node associated with the analyst identification in the blockchain network, an encrypted action plan summary transaction message including one or more data fields and a second analyst digital signature, the one or more data fields including the analyst identification, a client identification of a client node, the plan identification associated with the winning bid transaction, and plan information, the plan information encrypted using a client encryption key of a client cryptographic key pair corresponding to the client node, the plan information including a subject identification, a tilt value and a random number;
- generating, by the processing device, an encrypted action plan summary transaction including the content of the encrypted action plan summary transaction message; and
- transmitting, by the processing device, the encrypted action plan summary transaction to the blockchain network, the blockchain network having a plurality of nodes including the client node and the analyst node.

* * * * *